US010755123B1

(12) United States Patent
Mazuir et al.

(10) Patent No.: US 10,755,123 B1
(45) Date of Patent: Aug. 25, 2020

(54) WINDOW DEFECT SENSING AND IMAGE PROCESSING

(71) Applicant: Apple Inc., Cupertino, CA (US)

(72) Inventors: Clarisse Mazuir, San Jose, CA (US); Malcolm J. Northcott, Felton, CA (US); Jack E. Graves, Sunnyvale, CA (US); James R. Wilson, Cupertino, CA (US); Christopher D. Jones, Los Gatos, CA (US); Martin Melcher, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 15/980,637

(22) Filed: May 15, 2018

Related U.S. Application Data

(60) Provisional application No. 62/507,149, filed on May 16, 2017.

(51) Int. Cl.
| H04N 7/18 | (2006.01) |
| G06K 9/00 | (2006.01) |
| H04N 5/225 | (2006.01) |
| G06K 9/03 | (2006.01) |
| H04N 5/232 | (2006.01) |
| G06K 9/20 | (2006.01) |
| B60K 28/10 | (2006.01) |
| B60R 1/00 | (2006.01) |
| G05D 1/02 | (2020.01) |
| B60S 1/02 | (2006.01) |
| B60S 5/00 | (2006.01) |
| H04N 5/247 | (2006.01) |

(52) U.S. Cl.
CPC .......... *G06K 9/00832* (2013.01); *B60K 28/10* (2013.01); *B60R 1/00* (2013.01); *B60S 1/02* (2013.01); *B60S 5/00* (2013.01); *G05D 1/0231* (2013.01); *G05D 1/0246* (2013.01); *G05D 1/0257* (2013.01); *G06K 9/036* (2013.01); *G06K 9/2036* (2013.01); *H04N 5/2256* (2013.01); *H04N 5/23229* (2013.01); *H04N 5/247* (2013.01); *B60R 2300/30* (2013.01); *G05D 2201/0213* (2013.01)

(58) Field of Classification Search
USPC ....................................................... 348/131
See application file for complete search history.

(56) References Cited

U.S. PATENT DOCUMENTS 10,319,094 B1 * 6/2019 Chen .................... G06F 3/0484
2007/0115357 A1 * 5/2007 Stein .................... B60Q 1/0023
348/148

(Continued)

OTHER PUBLICATIONS

Jinwei Gu, et al., "Removing Image Artifacts Due to Dirty Camera Lenses and Thin Occluders", ACM Transactions on Graphics (TOG), vol. 28, No. 5, 2009, pp. 1-10.

*Primary Examiner* — Behrooz M Senfi
(74) *Attorney, Agent, or Firm* — Robert C. Kowert; Kowert, Hood, Munyon, Rankin & Goetzel, P.C.

(57) ABSTRACT

Various embodiments relate to sensing defects associated with a window. Furthermore, various embodiments relate to performing image processing to produce a corrected image of a scene based at least partly on data corresponding to the detected defects. In some examples, one or more lighting modules may be used to illuminate the window to facilitate detection of the defects by one or more sensor devices.

20 Claims, 12 Drawing Sheets

(56) References Cited

U.S. PATENT DOCUMENTS

2007/0115371 A1* 5/2007 Enomoto .................. G06T 5/00
                                                        348/222.1
2015/0276174 A1* 10/2015 Trajlinek .............. F21V 7/0091
                                                        362/477

* cited by examiner

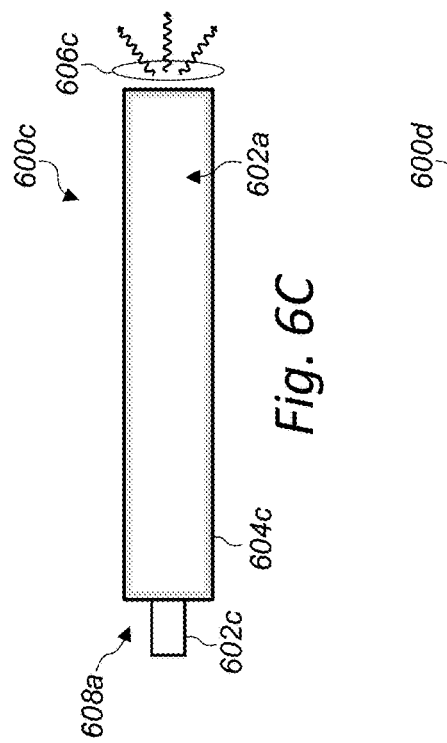
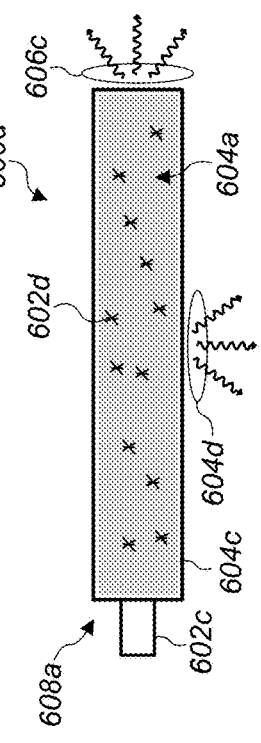
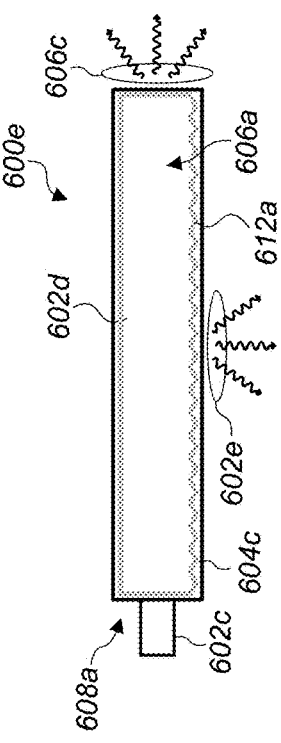
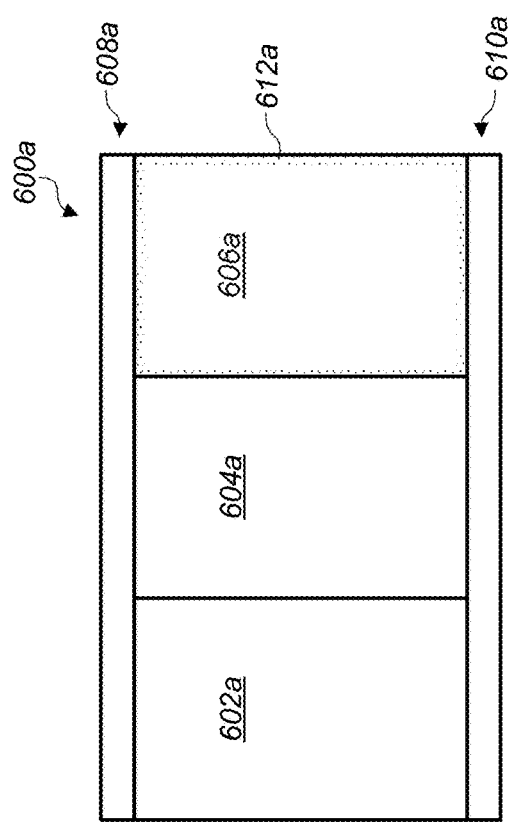
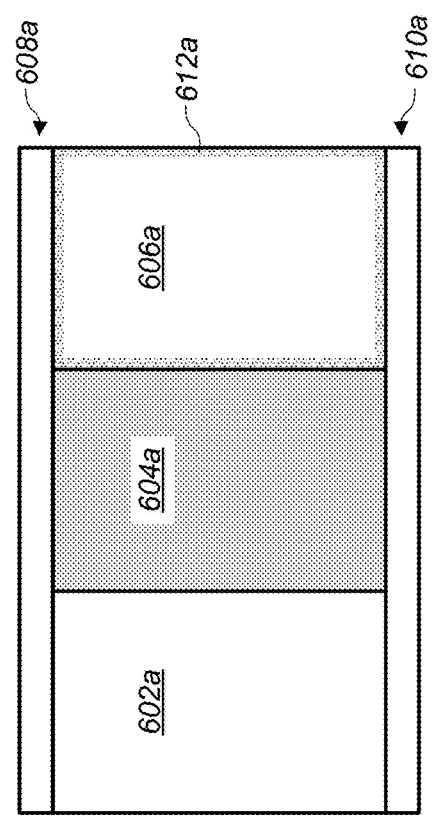

WINDOW DEFECT SENSING AND IMAGE PROCESSING

This application claims benefit of priority to U.S. Provisional Application Ser. No. 62/507,149, entitled "WINDOW DEFECT SENSING AND IMAGE PROCESSING," filed May 16, 2017, and which is incorporated herein by reference in its entirety.

BACKGROUND

Technical Field

This disclosure relates generally to systems, apparatus, and techniques for sensing defects associated with a window and for performing image processing based at least partly on the sensed defects.

Description of the Related Art

Images of objects and/or scenes may be captured for various purposes. For instance, a camera may be used to capture images to obtain information about an environment. Sometimes obstructions interfere with imaging. As an example, a dirty window may be located within a field of view of the camera and may negatively impact images captured by the camera of a scene.

Motorized vehicles which are capable of sensing their environment and navigating to destinations with little or no ongoing input from occupants, and may therefore be referred to as "autonomous" or "self-driving" vehicles, are an increasing focus of research and development. However, such vehicles typically include windows that interfere with the extent to which they are capable of sensing accurate representations of their environment.

SUMMARY OF EMBODIMENTS

Various embodiments described herein relate to sensing/detecting defects associated with a window and performing image processing to produce a corrected image of a scene based at least partly on data corresponding to the detected defects.

In some embodiments, a system may include a window, one or multiple sensor devices, one or multiple lighting modules, and/or one or multiple processors. For instance, a first sensor device may be configured to image at least a portion of the window (also referred to herein as the "window"). A second sensor device may be configured to image at least a portion of a scene (also referred to herein as the "scene"). In some instances, the window may be located within the field of view of the second sensor device. As such, defects associated with the window may induce image altering effects on images obtained via the second sensor device. For instance, surface defects on the window and/or volume defects within the window may induce image altering effects such as shadowing, scattering, distortion, glint, etc.

The lighting module(s) may be configured to illuminate the window to facilitate detection of the defects associated with the window. For instance, illumination of the window by the lighting module(s) may cause the defects to glow or otherwise act as secondary light sources, thereby making the defects easier to detect by a sensor device. In some examples, the lighting module(s) may include an edge lighting module and/or a graze lighting module. The edge lighting module may be configured to emit light, via one or multiple light sources, that is incident on at least one edge of the window. The graze lighting module may be configured to emit light, via one or multiple light sources, that is incident on at least one side of the window.

In some examples, the processor(s) may be configured to receive signals corresponding to images captured by the sensor devices, at least one of which may include an altered representation of the scene based on the image altering effects induced by the defects associated with the window. Furthermore, the processor(s) may perform image processing to compensate for the image altering effects induced by the defects and produce a corrected image of the scene.

In some examples, an individual sensor device may be configured with adaptive focus functionality such that the individual sensor is capable of adaptively switching between focusing on the window (to image the window) and focusing on the scene (to image the scene).

In some embodiments, a vehicle (e.g., an autonomous or partially-autonomous vehicle) may include one or more components of the system described above. For instance, the vehicle may include a window (e.g., a windshield) that at least partially encompasses an interior of the vehicle. In various examples, the vehicle may include one or multiple lighting modules configured to illuminate the window to facilitate detection of defects associated with the window.

According to various embodiments, the vehicle may include an imaging system that includes one or multiple sensor devices that are configured to perform imaging of objects. For instance, the imaging system may be configured to obtain data by imaging the window and/or a scene that is exterior to the vehicle.

Some embodiments include a method of detecting defects associated with a window and/or performing image deconvolution based on defects associated with the window. In various embodiments, the method may include one or more of the operations and components described above with respect to the system and the vehicle.

In some embodiments, the method may include illuminating a window such that defects associated with the window are illuminated to facilitate detection of the defects. For example, one or multiple lighting modules (e.g., the lighting modules described above with respect to the system and the vehicle) may be used to illuminate the window. Furthermore, the method may include imaging, via one or more sensor devices, the window and a scene. For instance, a first sensor device may be used to image the window to obtain first data corresponding to the defects associated with the window. Imaging of the window may occur while the defects are illuminated by the lighting module(s). A second sensor device may be used to image the scene. The window (and its defects) may be located between the second sensor device and the scene. By imaging the scene, the second sensor device may obtain second data corresponding to an altered representation of the scene based at least in part on image altering effects induced by the defects.

In various implementations, the method may include deconvolving (e.g., via one or more processors) the second data to produce a corrected image of the scene. For instance, the second data (which may include the altered representation of the scene) may be deconvolved based at least in part on the first data (corresponding to the defects). To deconvolve the second data, the processor(s) may perform image processing to compensate for the image altering effects induced by the defects.

BRIEF DESCRIPTION OF DRAWINGS

FIGS. 6A-6E illustrate examples of window illumination using edge lighting modules for defect detection, in accordance with some embodiments. FIGS. 6A and 6B illustrate schematic front views of window panels and edge lighting modules. FIGS. 6C-6E each provide a schematic top view of a respectively illuminated window panel of the window panels of FIGS. 6A and 6B.

Figure 1:
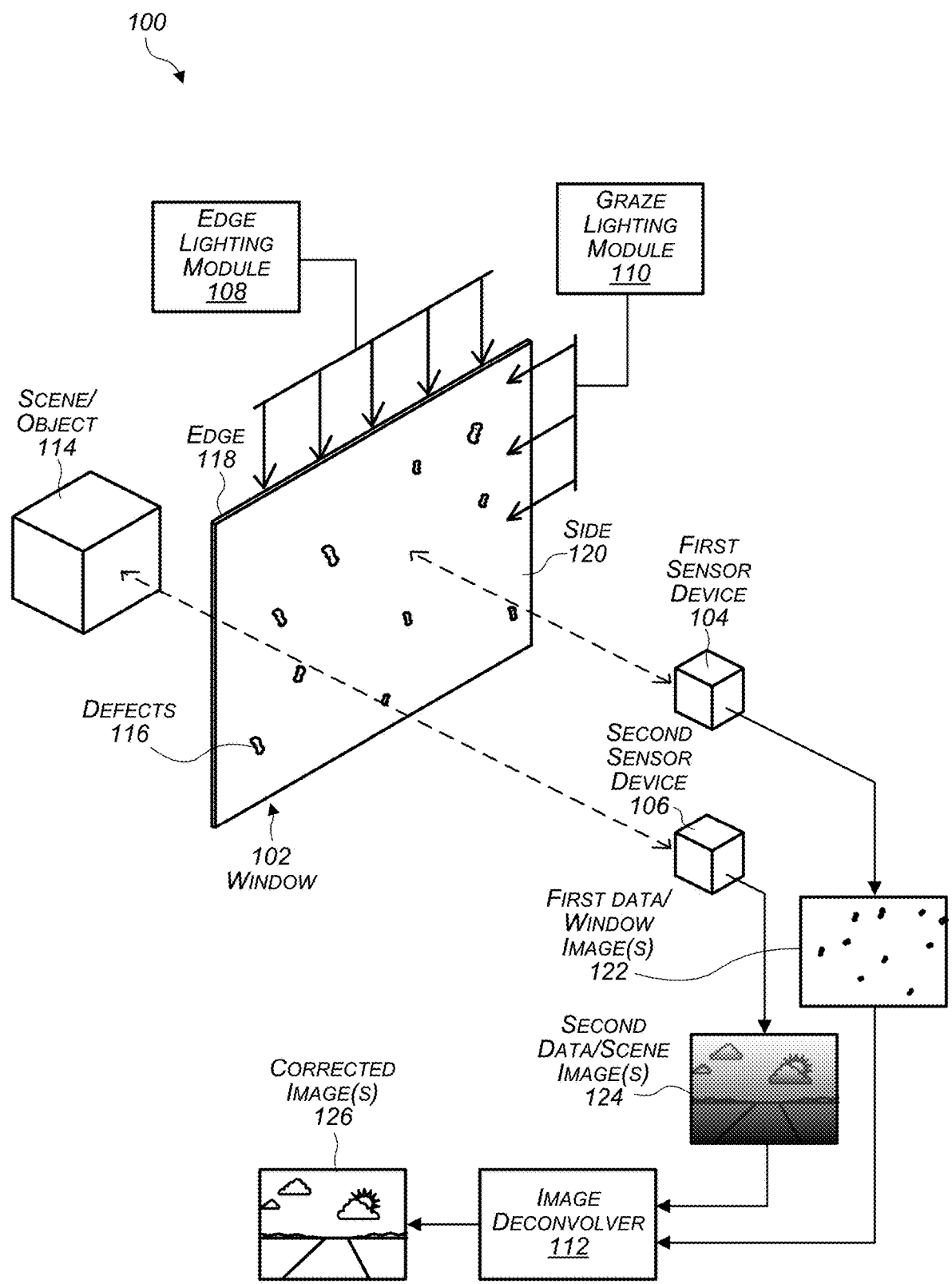
FIG. 1 illustrates a schematic diagram of an example system for detecting defects associated with a window and/or performing image processing to produce a corrected image of a scene based at least partly on data corresponding to the detected defects, in accordance with some embodiments. The diagram of FIG. 1 includes a schematic perspective view of the window and sensor device(s) of the system.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments described herein relate to sensing/detecting defects associated with a window and performing image processing to produce a corrected image of a scene based at least partly on data corresponding to the detected defects. In some cases, the defects associated with the window may interfere with imaging of the scene. For instance, the window may be located between the scene and a sensor device used to capture images of the scene. As such, rather than providing an accurate representation of the scene, the images of the scene may provide an altered representation of the scene, e.g., a representation of the scene that is altered based at least in part on image altering effects caused by the defects.

According to various embodiments, to obtain an accurate representation of the scene, a corrected image may be produced by performing image processing based at least partly on data corresponding to the window defects. A sensor device may be used to capture images of the window to obtain the data corresponding to the window defects. Furthermore, one or multiple lighting modules may be used to illuminate the window to facilitate detection of the defects by the sensor device.

In some embodiments, a system may include a window, one or multiple sensor devices, one or multiple lighting modules, and/or one or multiple processors. For instance, a first sensor device may be configured to image at least a portion of the window (also referred to herein as the "window"). A second sensor device may be configured to image at least a portion of a scene (also referred to herein as the "scene"). In some instances, the window may be located within the field of view of the second sensor device. As such, defects associated with the window may induce image altering effects on images obtained via the second sensor device. For instance, surface defects on the window and/or volume defects within the window may induce image altering effects such as shadowing, scattering, distortion, glint, etc.

The lighting module(s) may be configured to illuminate the window to facilitate detection of the defects associated with the window. For instance, illumination of the window by the lighting module(s) may cause the defects to glow or otherwise act as secondary light sources, thereby making the defects easier to detect by a sensor device. In some examples, the lighting module(s) may include an edge lighting module and/or a graze lighting module. The edge lighting module may be configured to emit light, via one or multiple light sources, that is incident on at least one edge of the window. The graze lighting module may be configured to emit light, via one or multiple light sources, that is incident on at least one side of the window.

In some examples, the processor(s) may be configured to receive signals corresponding to images captured by the sensor devices, at least one of which may include an altered representation of the scene based on the image altering effects induced by the defects associated with the window. Furthermore, the processor(s) may perform image processing to compensate for the image altering effects induced by the defects and produce a corrected image of the scene.

For example, the processor(s) may receive a first set of one or more signals corresponding to a first image (or multiple images) captured by the first sensor device. For instance, the first sensor device may capture the first image by imaging the window while the window is illuminated by the lighting module(s). The first set of signals may include data corresponding to the defects associated with the window (also referred to herein as "defect data").

Furthermore, the processor(s) may be configured to receive a second set of one or more signals corresponding to a second image (or multiple images) captured by the second sensor device. For instance, the second sensor device may capture the second image by imaging the scene. The second set of signals and/or the second image may include an altered representation of the scene based at least in part on the image altering effects induced by the defects associated with the window.

In various embodiments, the processor(s) may be configured to deconvolve the second set of signals to produce a corrected image of the scene. For instance, the second set of signals (which may include the altered representation of the scene) may be deconvolved based at least in part on the first set of signals (which may include the defect data). To deconvolve the second set of signals, the processor(s) may perform image processing to compensate for the image altering effects induced by the defects.

According to some embodiments, an edge lighting module may include a light source (or multiple light sources) and a light guide. The light guide may extend along at least a portion of an edge of the window. Furthermore, the light guide may be configured to direct light from the light source to the window. In some cases, at least a portion of an edge lighting module may extend along a top edge of the window and may be configured to provide light in a downward direction through the window. Additionally, or alternatively, at least a portion of the edge lighting module may extend along a bottom edge of the window and may be configured to provide light in an upward direction through the window.

In some cases, the sensor device(s) may include a camera, a radar device, and/or a light detection and ranging (LIDAR) device. In a non-limiting example, the first sensor device may be a first camera that is focused on the window, and the second sensor device may be a second camera that is focused on the scene. However, in some embodiments, the system may include multiple different types of sensor devices.

Furthermore, in some examples, an individual sensor device may be configured with adaptive focus functionality such that the individual sensor is capable of adaptively switching between focusing on the window (to image the window) and focusing on the scene (to image the scene).

In some embodiments, a vehicle (e.g., an autonomous or partially-autonomous vehicle) may include one or more components of the system described above. For instance, the vehicle may include a window (e.g., a windshield) that at least partially encompasses an interior of the vehicle. In various examples, the vehicle may include one or multiple lighting modules configured to illuminate the window to facilitate detection of defects associated with the window.

According to various embodiments, the vehicle may include an imaging system that includes one or multiple sensor devices that are configured to perform imaging of objects. For instance, the imaging system may be configured obtain first data by imaging the window while the window is illuminated by the lighting module(s). The first data may include a representation of the defects associated with the window. Furthermore, the imaging system may be configured to obtain second data by imaging a scene that is exterior to the vehicle. The second data may include an altered representation of the scene based at least in part on image altering effects induced by the defects associated with the window.

In some examples, the vehicle may include one or multiple processors configured to perform operations. For example, the operations may include evaluating, based at least in part on the first data, one or more parameters that characterize one or more defects associated with the window to produce parameter evaluation data. The parameters may include a distribution of the defects with respect to the window. In some examples, the operations may include determining to modify a state of operation of the vehicle based at least in part on the parameter evaluation data. In some embodiments, the operations may include deconvolving the second data to produce a corrected image of the scene. For instance, the second data (which may include the altered representation of the scene) may be deconvolved based at least in part on the first data (which may include the representation of the defects). To deconvolve the second data, the processor(s) may perform image processing to compensate for the image altering effects induced by the defects.

In some embodiments, the imaging system may include a sensor device that is configured to obtain both the first data and the second data. For instance, the sensor device may be configured with adaptive focus functionality that allows the sensor device to adaptively switch focusing between the window (to image the window and obtain the first data) and focusing on the scene (to image the scene and obtain the second data). Additionally, or alternatively, the imaging system may include a first sensor device configured to obtain the first data, and a second sensor device configured to obtain the second data. For example, the first sensor device may be configured to focus on the window to image the window and obtain the first data. The second sensor device may be configured to focus on the scene to image the scene and obtain the second data. In various embodiments, the sensor device(s) of the imaging system may include a camera, a radar device, and/or a light detection and ranging (LIDAR) device.

Furthermore, in some embodiments, the imaging system may include multiple sensor devices that are individually configured to image and obtain data corresponding to a respective portion of multiple portions of the window. For instance, a first sensor device be configured to image and obtain data corresponding to a first portion of the window, a second sensor device may be configured to image and obtain data corresponding to a second portion of the window, etc. The processor(s) may be configured to deconvolve the second data (obtained by imaging the scene) to produce the corrected image based at least in part on the data obtained by imaging multiple portions of the window.

In some cases, the processor(s) may be configured to determine to modify a state of operation of the vehicle based at least in part on the first data (obtained by imaging the window) and/or the corrected image. Additionally, or alternatively, the processor(s) may be configured to determine to modify a state of operation of the vehicle based at least in part on one or more degrees of confidence assigned to the first data (obtained by imaging the window), the second data (obtained by imaging the scene), and/or the corrected image. The processor(s) may be configured to assign the one or more degrees of confidence to the first data, the second data, and/or the corrected image.

In some examples, the vehicle may include a window cleaning system configured to spot clean the window. For instance, the processor(s) may be configured to evaluate, based at least in part on the first data (obtained by imaging the window), one or more parameters that characterize the defects associated with the window to produce parameter evaluation data. The parameters may include, for example, a distribution of the defects with respect to the window. The processor(s) may determine, based at least in part on the parameter evaluation data, to cause the window cleaning system to spot clean one or more particular areas of the window.

Additionally, or alternatively, the processor(s) may be configured to determine to designate a repair status and/or a replace status to the window or one or more portions of the window. In some examples, designation of the repair status and/or the replace status may be based at least in part on the first data obtained by imaging the window. Designation of the repair status may indicate a suggestion to repair at least a portion of the window. Similarly, designation of the replace status may indicate a suggestion to replace at least a portion of the window.

Some embodiments include a method of detecting defects associated with a window and/or performing image deconvolution based on defects associated with the window. In various embodiments, the method may include one or more of the operations and components described above with respect to the system and the vehicle.

In some embodiments, the method may include illuminating a window such that defects associated with the window are illuminated to facilitate detection of the defects. For example, one or multiple lighting modules (e.g., the lighting modules described above with respect to the system and the vehicle) may be used to illuminate the window. Furthermore, the method may include imaging, via one or more sensor devices, the window and a scene. For instance, a first sensor device may be used to image the window to obtain first data corresponding to the defects associated with the window. Imaging of the window may occur while the defects are illuminated by the lighting module(s). A second sensor device may be used to image the scene. The window (and its defects) may be located between the second sensor device and the scene. By imaging the scene, the second sensor device may obtain second data corresponding to an altered representation of the scene based at least in part on image altering effects induced by the defects.

In various implementations, the method may include deconvolving (e.g., via one or more processors) the second data to produce a corrected image of the scene. For instance, the second data (which may include the altered representation of the scene) may be deconvolved based at least in part on the first data (corresponding to the defects). To deconvolve the second data, the processor(s) may perform image processing to compensate for the image altering effects induced by the defects.

FIG. 1 illustrates a schematic diagram of an example system 100 for detecting defects associated with a window and/or performing image processing to produce a corrected image of a scene based at least partly on data corresponding to the detected defects, in accordance with some embodiments. In various embodiments, the system 100 may include a window 102, one or multiple sensor devices (e.g., first sensor device 104 and/or second sensor device 106), one or multiple lighting modules (e.g., edge lighting module 108 and/or graze lighting module 110), and/or one or multiple processors (e.g., one or more processors of image deconvolver 112). In some embodiments, the system 100 may include one or more multiple features, components, and/or operations of embodiments described herein with reference to FIGS. 2-12.

In some examples, the first sensor device 104 may be configured to image the window 102 to detect defects 116 associated with the window 102. For instance, the defects 116 may include surface defects (e.g., dust particles on the window) and/or volume defects (e.g., cracks within the window). The second sensor device 106 may be configured to image a scene (or object) 106. In some cases, the window 102 may be located within the field of view of the second sensor device 106. As such, the defects 116 associated with the window 102 may induce image altering effects on images obtained via the second sensor device 106. For instance, the image altering effects may include shadowing, scattering, distortion, and/or glint. It should be understood, however, that the defects 116 associated with the window 102 may cause other types of image altering effects.

The lighting module(s) may be configured to illuminate the window 102 to facilitate detection of the defects 116 associated with the window 102. For instance, illumination of the window 102 by the lighting module(s) may cause the defects 116 to glow or otherwise act as secondary light sources, thereby making the defects easier to detect by a sensor device (e.g., sensor device 104). In some examples, the lighting module(s) may include an edge lighting module 108 and/or a graze lighting module 110. The edge lighting module 108 may be configured to emit light, via one or multiple light sources, that is incident on at least one edge of the window (e.g., edge 118). The graze lighting module 110 may be configured to emit light, via one or multiple light sources, that is incident on at least one side of the window (e.g., side 120). For instance, the graze lighting module 110 may be configured to emit light that hits the side 120 of the window at a non-zero angle.

In some examples, the image deconvolver 112 may be configured to receive data and/or signals corresponding to images captured by the sensor devices 104, 106. For instance, the image deconvolver 112 may receive, as an input, first data 122 corresponding to one or more images captured by the first sensor device 104. In some cases, the first sensor device 104 may capture images by imaging the window 102 while the window 102 is illuminated by the edge lighting module and/or the graze lighting module 110. The first data 122 may include data corresponding to the defects 116 associated with the window 102. For example, the first data 122 may include data indicating, with respect to the defects, one or more of: type, shape, size, chemistry, location, distribution, pattern, movement, etc.

In various embodiments, the image deconvolver 112 may be configured to receive, as an input, second data 124 corresponding to one or more images captured by the second sensor device 106. In some cases, the second sensor device 106 may capture images by imaging the scene 114. The second data 124 may include an altered representation of the scene 114 based at least in part on the image altering effects induced by the defects 116 associated with the window 102.

As a non-limiting example, the scene 114 may include a road, a horizon, clouds, and the sun. The scene image in the block corresponding to the second data 124 may provide an example of an altered representation of the scene 114. As indicated in the scene image 124, the defects 116 associated with the window 102 may induce image altering effects such as shadowing and/or scattering. For instance, notice that the bottom portion of the scene image 124 is darker than the top portion of the scene image 124.

In some examples, at least a portion of the scene image 124 may be uniformly altered and/or the alteration may have structure and impact different pixels of a sensor (e.g., a sensor of the second sensor device 106) in different manners. The alteration may depend on the type of defects 116 associated with the window 102, the type of sensor(s)/sensor device(s) used to detect the defects 116, and/or the sensor arrangement (e.g., a sensor location relative to the window 102 and/or the scene 114).

In various cases, the altered representation of the scene 114 may not be a desirable representation of the scene 114. For instance, in some examples, the system 100 may be implemented in the context of an autonomous or partially-autonomous vehicle, and accurate images/representations of the scene 114 may be desired for making decisions regarding navigation and/or other vehicle operations. In other examples, the system 100 may be implemented in other contexts in which the altered representation of the scene 114 may not be desirable. Accordingly, the image deconvolver 112 may be configured to deconvolve the second data 124 to produce one or more corrected images 126 of the scene 114. For instance, a corrected image 126 of the scene 114 may include an accurate representation of the scene 114, or at least a representation that is more accurate, with respect to the scene, than the altered representation provided by the second data 124.

In some embodiments, the image deconvolver 112 may be configured to deconvolve the second data 124 (which may include the altered representation of the scene 114) based at least in part on the first data 122 (which may include the data corresponding to the defects 116) to produce a corrected image 126 of the scene 114. To deconvolve the second data 124, the image deconvolver 112 may perform image processing to compensate for the image altering effects induced by the defects 116. In some examples, the image deconvolver 112 may use the first data 122 to predict how defects 116 will alter the imaging of the scene 114. As a non-limiting example, the image deconvolver 112 may predict that dust particles on the window 102 will induce a scattering effect on scene images 124 captured by the second sensor device 106. Accordingly, the image deconvolver 112 may perform image processing to compensate for the scattering effect and/or any other image altering effect predicted by the image deconvolver 112.

Referring back to the non-limiting example of the scene 114 discussed above, the corrected image(s) produced by the image deconvolver 112 may include an accurate representation of the road, horizon, clouds, and sun in the scene 114. As indicated by the image of the scene 114 in the block corresponding to the corrected image 126, the image deconvolver 114 may remove, reduce, or otherwise compensate for the image altering effects induced by the defects 116 associated with the window 102. Thus, the corrected image 126 may provide a clearer, higher quality, and/or more accurate representation of the scene 114 than the scene image 124 obtained via the second sensor device 106.

In some cases, the sensor device(s) may include a camera, a radar device, and/or a light detection and ranging (LIDAR) device. In a non-limiting example, the first sensor device may be a first camera that is focused on the window, and the second sensor device may be a second camera that is focused on the scene. However, in some embodiments, the system may include multiple different types of sensor devices. Furthermore, it should be understood that any other types of sensor devices suitable for imaging the window 102 and/or the scene 114 may be used in various embodiments.

As discussed in further detail below with reference to FIG. 4, in some embodiments an individual sensor device may be configured to adaptively switch between imaging a window and imaging a scene. For instance, the individual sensor device may be configured with adaptive focus functionality such that the individual sensor device is capable of adaptively switching between focusing on the window (to image the window) and focusing on the scene (to image the scene).

Figure 2:
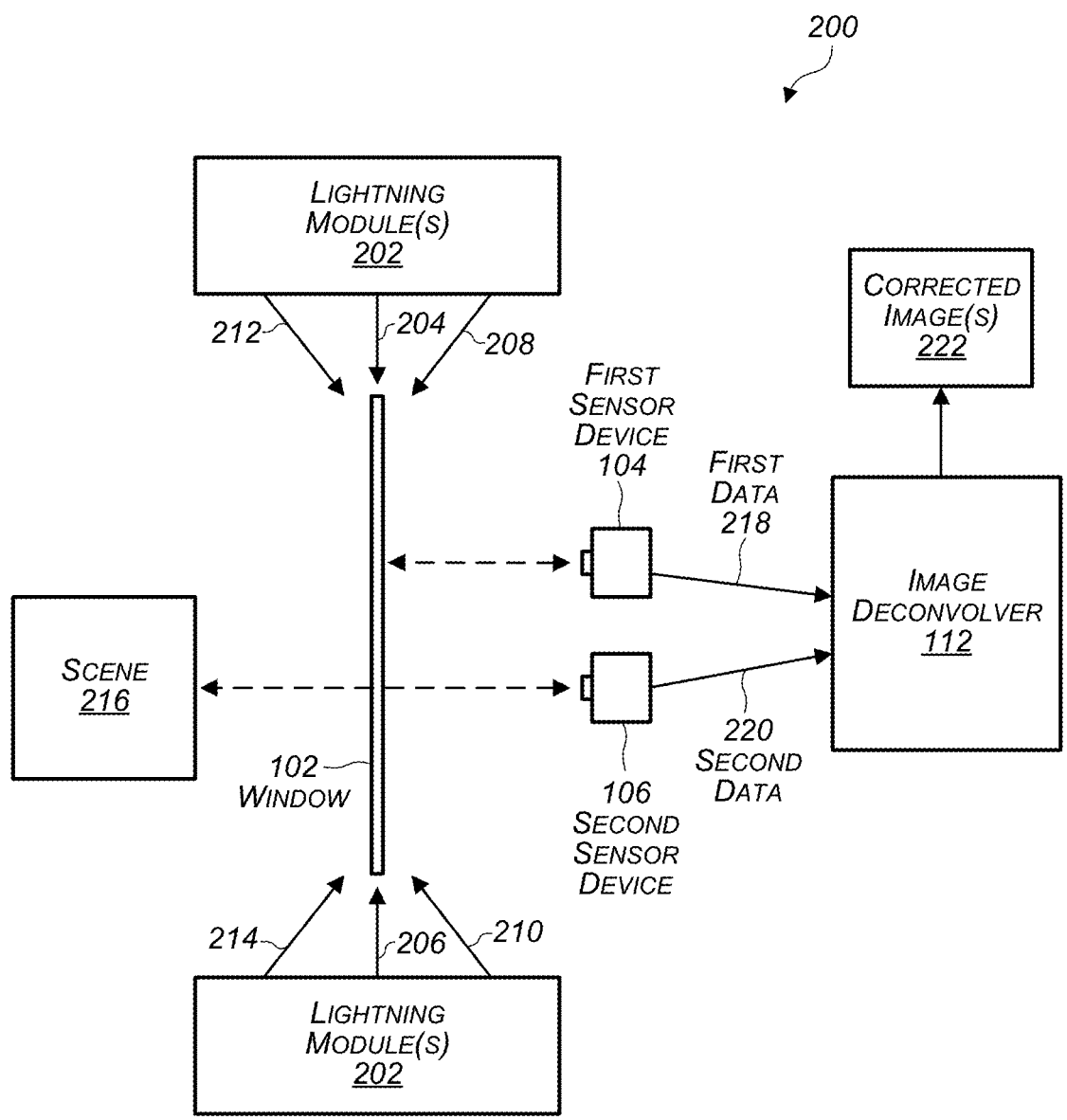
FIG. 2 illustrates a schematic diagram of another example system for detecting defects associated with a window and/or performing image processing to produce a corrected image of a scene based at least partly on data corresponding to the detected defects, in accordance with some embodiments. The diagram of FIG. 2 includes a schematic side view of the window and sensor devices of the system, where the sensor devices are to a same side of the window.

FIG. 2 illustrates a schematic diagram of another example system 200 for detecting defects associated with a window and/or performing image processing to produce a corrected image of a scene based at least partly on data corresponding to the detected defects, in accordance with some embodiments. In some embodiments, the system 200 may include one or more multiple features, components, and/or operations of embodiments described herein with reference to FIGS. 1 and 3-12. For instance, the system 200 may include the window 102, one or multiple sensor devices (e.g., the first sensor device 104 and/or the second sensor device 106), one or multiple lighting modules 202 (e.g., edge lighting module 108 and/or graze lighting module 110), and/or one or multiple processors (e.g., one or more processors of image deconvolver 112).

In some embodiments, the lighting module(s) 202 may include one or multiple edge lighting modules that are individually configured to emit light that is incident on at least one respective edge of the window 102. For instance, the lighting module(s) 202 may include a top edge lighting module that may extend along a top edge of the window 102. The top edge lighting module may be configured to provide light in a downward direction through the window 102, as indicated by arrow 204. Additionally, or alternatively, the lighting module(s) 202 may include a bottom edge lighting module that may extend along a bottom edge of the window 102. The bottom edge lighting module may be configured to provide light in an upward direction through the window 102, as indicated by arrow 206. In other embodiments, the lighting module(s) may include one or more edge lighting modules that are configured to provide light via other edges of the window 102 (e.g., in directions orthogonal to the side view of the window illustrated in FIG. 2).

In some examples, the lighting module(s) 202 may include one or multiple graze lighting modules that are individually configured to emit light that is incident on at least one respective side of the window 102. For instance, the lighting module(s) 202 may include a first set of one or more graze lighting modules that are configured to emit light that is incident on a first side of the window, e.g., in the directions indicated by arrows 208 and 210. Additionally, or alternatively, the lighting module(s) 202 may include a second set of one or more graze lighting modules that are configured to emit light that is incident on a second side of the window, e.g., in the directions indicated by arrows 212 and 214. In various embodiments, light emitted by a graze lighting module may hit a side of the window 102 at an angle or at multiple different angles. For instance, the graze lighting module (or a combination of multiple graze lighting modules) may include different sets of light with different angles of illumination incident on the window 102.

Figure 3:
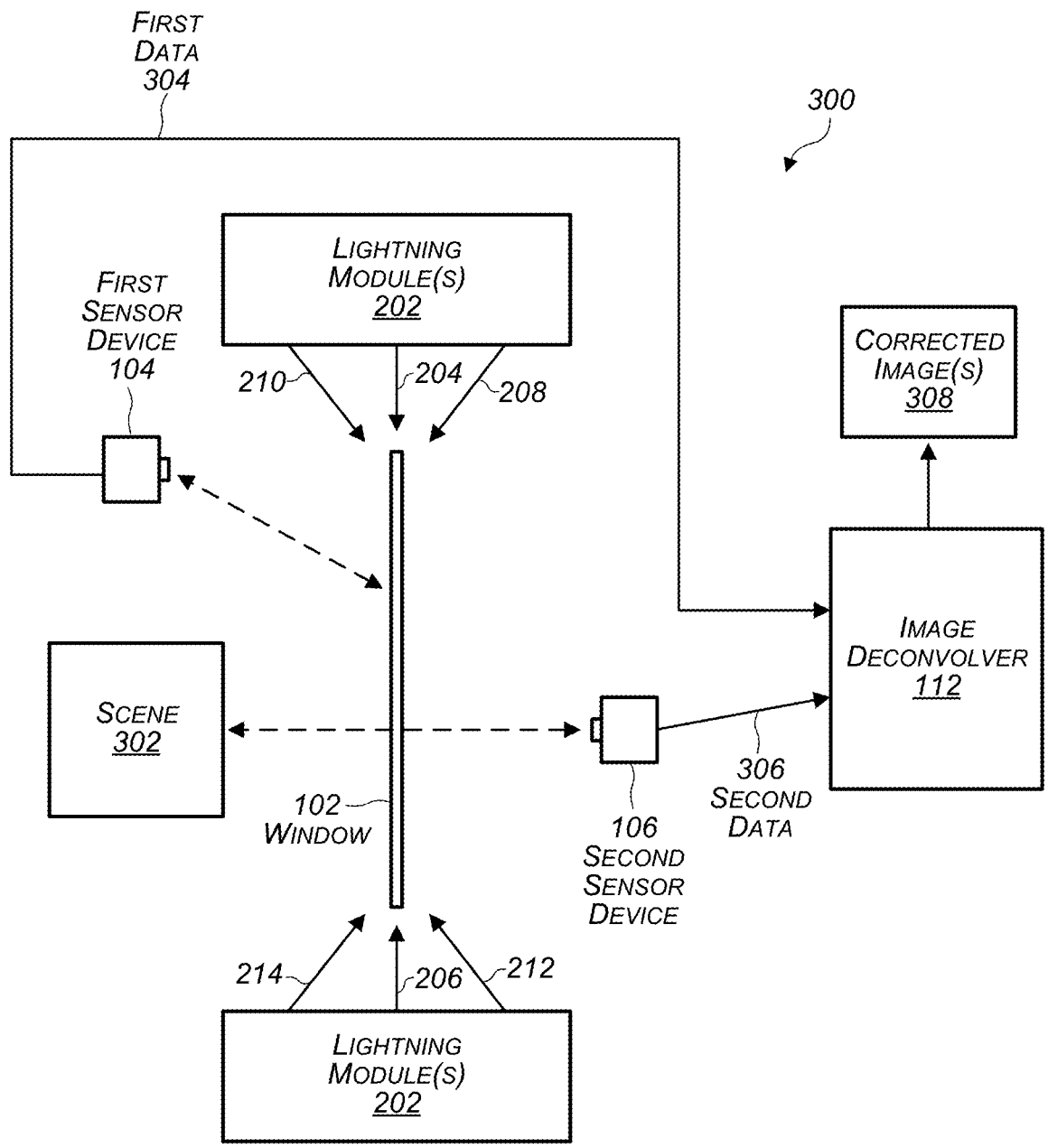
FIG. 3 illustrates a schematic diagram of yet another example system for detecting defects associated with a window and/or performing image processing to produce a corrected image of a scene based at least partly on data corresponding to the detected defects, in accordance with some embodiments. The diagram of FIG. 3 includes a schematic side view of the window and sensor devices of the system, where the sensor devices are to opposite sides of the window.

As illustrated in FIG. 2, in various embodiments the sensor devices 104, 106 may be to a same side of the window 102. The scene 216 may be to an opposite side of the window relative to the sensor device 104, 106. That is, the window 102 may be located between the sensor devices 104, 106 and the scene 216. However, in other embodiments, one or more sensor devices may be located to a same side of the window 102 as the scene 216, e.g., as shown in FIG. 3. As discussed above with reference to FIG. 1, the first sensor device 104 may be configured to image the window 102 to detect defects associated with the window 102. The second sensor device 106 may be configured to image the scene 216.

In various examples, the image deconvolver 112 may be configured to receive, as input, data and/or signals corresponding to images captured by the sensor devices 104, 106. For instance, the image deconvolver 112 may receive first data 218 from the first sensor device 104, and second data 220 from the second sensor device 106. The first data 218 may include data corresponding to defects associated with the window 102. The second data 220 may include an altered representation of the scene 216 based at least in part on image altering effects induced by the defects associated with the window 102. The image deconvolver 112 may be configured to deconvolve the second data 220 based at least in part on the first data 218 to produce a corrected image 222 of the scene 216, e.g., as discussed above with reference to FIG. 1.

FIG. 3 illustrates a schematic diagram of yet another example system 300 for detecting defects associated with a window and/or performing image processing to produce a corrected image of a scene based at least partly on data corresponding to the detected defects, in accordance with some embodiments. In some embodiments, the system 300 may include one or more multiple features, components, and/or operations of embodiments described herein with reference to FIGS. 1, 2, and 4-12. For instance, the system 300 may include the window 102, one or multiple sensor devices (e.g., the first sensor device 104 and/or the second sensor device 106), one or multiple lighting modules 202 (e.g., edge lighting module 108 and/or graze lighting module 110), and/or one or multiple processors (e.g., one or more processors of image deconvolver 112).

As illustrated in FIG. 3, in various embodiments the sensor devices 104, 106 may be to opposite sides of the window 102. The first sensor device 104 may be to a same side of the window 102 as the scene 302, and the second sensor device 106 may be to an opposing side of the window 102. That is, the window 102 may be disposed between the first sensor device 104 and the second sensor device 106. As discussed above with reference to FIG. 1, the first sensor device 104 may be configured to image the window 102 to detect defects associated with the window 102. The second sensor device 106 may be configured to image the scene 216.

In various examples, the image deconvolver 112 may be configured to receive, as input, data and/or signals corresponding to images captured by the sensor devices 104, 106. For instance, the image deconvolver 112 may receive first data 304 from the first sensor device 104, and second data 306 from the second sensor device 106. The first data 304 may include data corresponding to defects associated with the window 102. The second data 306 may include an altered representation of the scene 302 based at least in part on image altering effects induced by the defects associated with the window 102. The image deconvolver 112 may be configured to deconvolve the second data 306 based at least in part on the first data 304 to produce a corrected image 308 of the scene 302, e.g., as discussed above with reference to FIG. 1.

Figure 4:
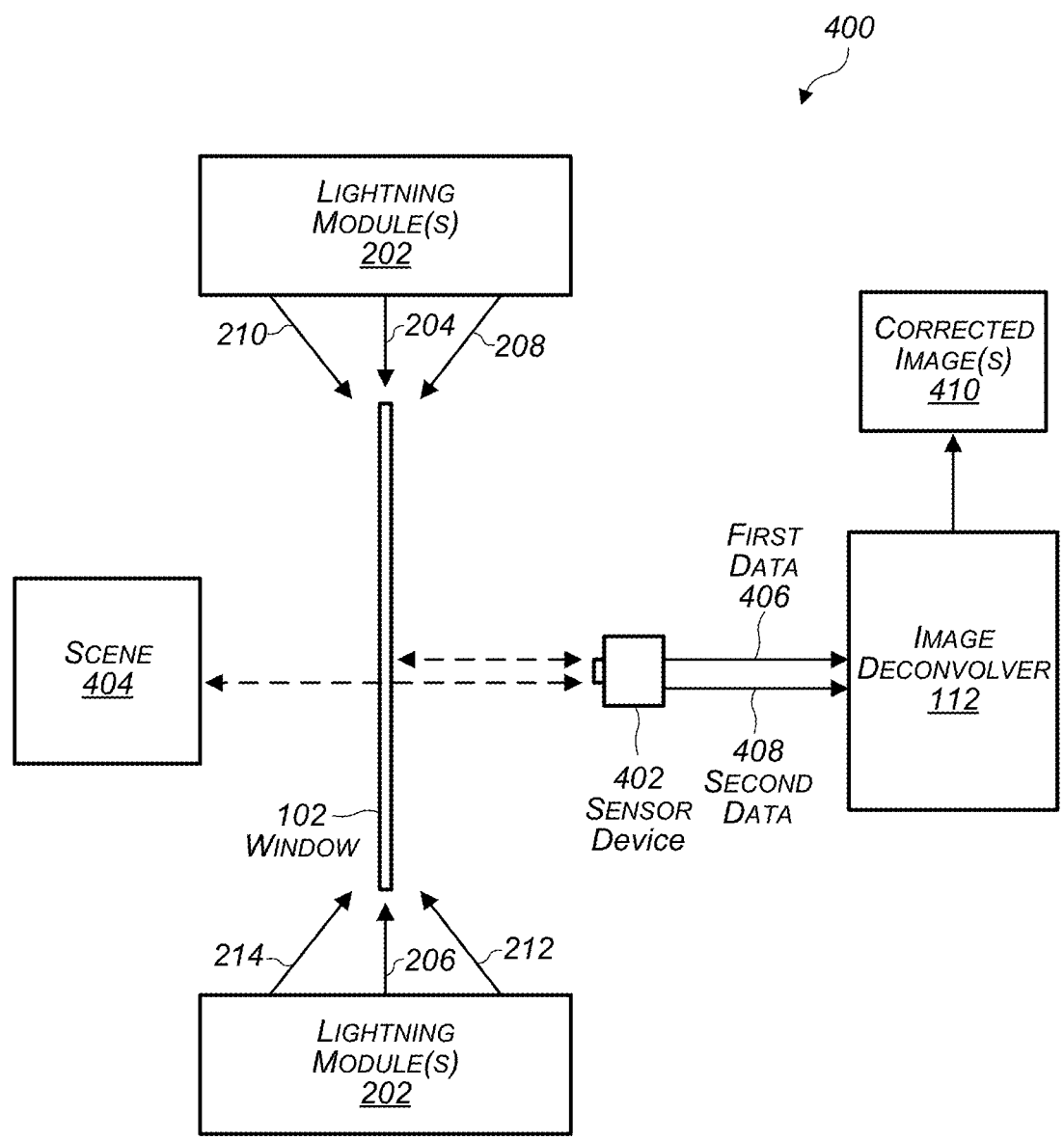
FIG. 4 illustrates a schematic diagram of still yet another example system for detecting defects associated with a window and/or performing image processing to produce a corrected image of a scene based at least partly on data corresponding to the detected defects, in accordance with some embodiments. The diagram of FIG. 4 includes a schematic side view of the window and an individual sensor device of the system.

FIG. 4 illustrates a schematic diagram of still yet another example system 400 for detecting defects associated with a window and/or performing image processing to produce a corrected image of a scene based at least partly on data corresponding to the detected defects, in accordance with some embodiments. In some embodiments, the system 400 may include one or more multiple features, components, and/or operations of embodiments described herein with reference to FIGS. 1-3 and 5-12. The system 400 may include the window 102, a sensor device 402, one or multiple lighting modules 202 (e.g., edge lighting module 108 and/or graze lighting module 110), and/or one or multiple processors (e.g., one or more processors of image deconvolver 112).

As illustrated in FIG. 4, in various embodiments the system 400 may include an individual sensor device 402 that is configured to image the window 102 to detect defects (e.g., as performed by the first sensor device 104 described above with reference to FIGS. 1-3), and to image the scene 404 (e.g., as performed by the second sensor device 106 described above with reference to FIGS. 1-3). In some examples, the sensor device 402 may be configured with adaptive focus functionality such that it is capable of adaptively switching between focusing on the window 102 (to image the window) and focusing on the scene 404 (to image the scene).

In various examples, the image deconvolver 112 may be configured to receive, as input, data and/or signals corresponding to images captured by the sensor device 402. For instance, the image deconvolver 112 may receive, from the sensor device 402, first data 406 that includes data corresponding to defects associated with the window 102. Furthermore, the image deconvolver 112 may receive, from the sensor device 402, second data 408 that includes an altered representation of the scene 404 based at least in part on image altering effects induced by the defects associated with the window 102. The image deconvolver 112 may be configured to deconvolve the second data 408 based at least in part on the first data 406 to produce a corrected image 410 of the scene 404, e.g., as discussed above with reference to FIG. 1.

Figure 5:
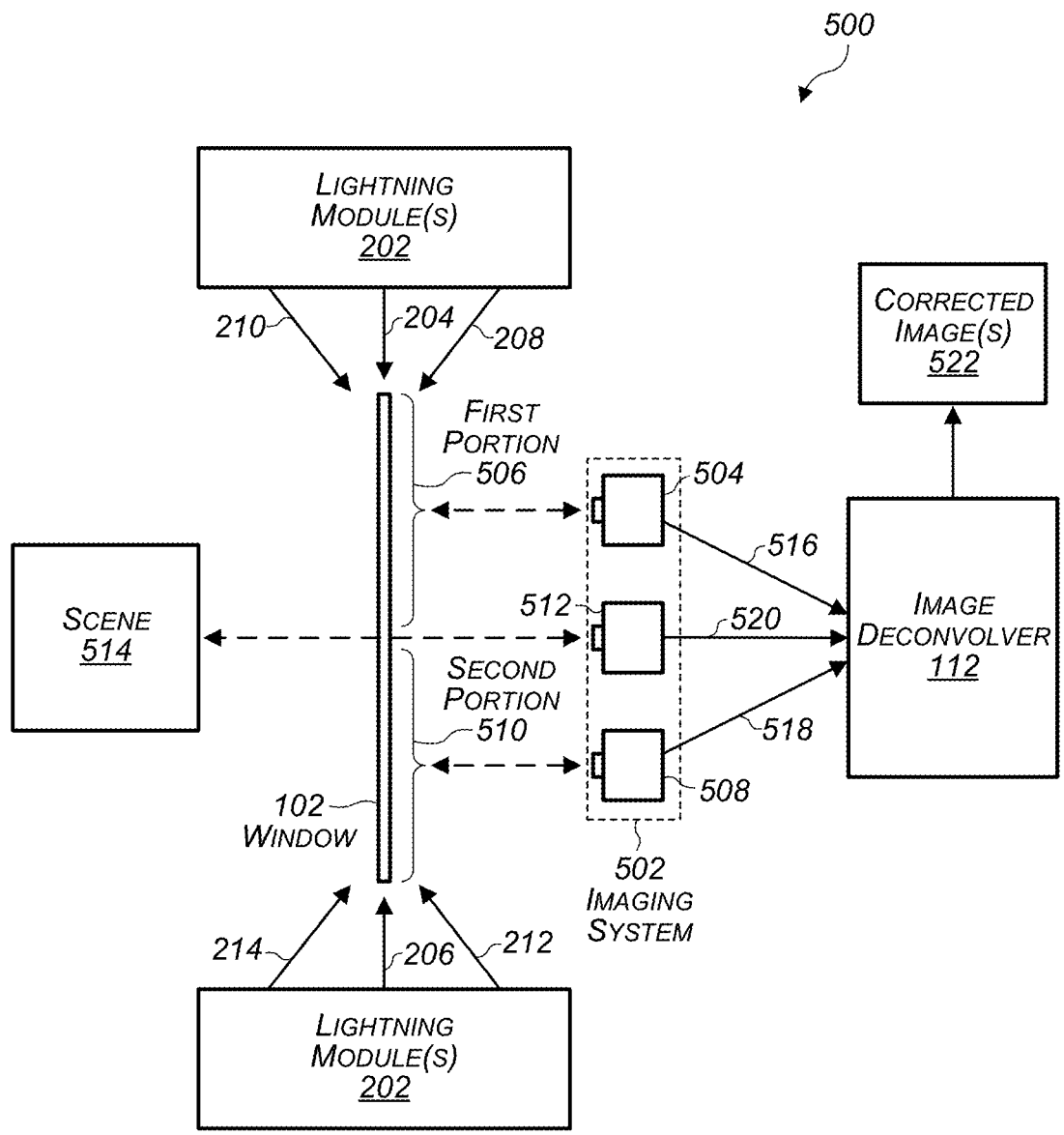
FIG. 5 illustrates a schematic diagram of still yet another example system for detecting defects associated with a window and/or performing image processing to produce a corrected image of a scene based at least partly on data corresponding to the detected defects, in accordance with some embodiments. The diagram of FIG. 5 includes a schematic side view of the window and sensor devices of the system, where multiple sensor devices are individually configured to image a respective portion of the window.

FIG. 5 illustrates a schematic diagram of still yet another example system 500 for detecting defects associated with a window and/or performing image processing to produce a corrected image of a scene based at least partly on data corresponding to the detected defects, in accordance with some embodiments. In some embodiments, the system 500 may include one or more multiple features, components, and/or operations of embodiments described herein with reference to FIGS. 1-4 and 6-12. The system 500 may include the window 102, an imaging system 502, one or multiple lighting modules 202 (e.g., edge lighting module 108 and/or graze lighting module 110), and/or one or multiple processors (e.g., one or more processors of image deconvolver 112).

As illustrated in FIG. 5, in various embodiments the imaging system 502 may include sensor devices that individually image a respective portion of the window 102. For instance, a first sensor device 504 may be used to image a first portion 506 of the window 102, and a second sensor device 508 may be used to image a second portion 510 of the window 102. The second portion 510 of the window 102 may be different than the first portion 506 of the window 102. Although FIG. 5 depicts two sensor devices 504, 508 for imaging respective portions of the window, it should be understood that a different number of sensor devices may be used to image respective portions of the window in some embodiments.

In some examples, the imaging system 502 may include a third sensor device 512 for imaging the scene 514. In some embodiments, the window 102 may be disposed between sensor devices of the imaging system 502 and the scene 514. For instance, the window 102 may be located within a field of view of the third sensor device 512 that is configured to image the scene 514. Although FIG. 5 depicts a single sensor device (third sensor device 512 for imaging the scene 514, it should be understood that multiple sensor devices may be used to image the scene in some embodiments.

In various examples, the image deconvolver 112 may be configured to receive, as input, data and/or signals corresponding to images captured by the sensor devices 504, 508, and 512. For instance, the image deconvolver 112 may receive first data 516 from the first sensor device 504, second data 518 from the second sensor device 508, and third data 520 from the third sensor device 512. The first data 516 may include data corresponding to defects associated with the first portion 506 of the window 102. The second data 518 may include data corresponding to defects associated with the second portion 510 of the window 102. The third data 520 may include an altered representation of the scene 514 based at least in part on image altering effects induced by the defects associated with the window 102. The image deconvolver 112 may be configured to deconvolve the third data 520 based at least in part on at least one of the first data 516 or the second data 518 to produce a corrected image 522 of the scene 514, e.g., as discussed above with reference to FIG. 1.

FIGS. 6A-6E illustrate examples of window illumination using edge lighting modules for defect detection, in accordance with some embodiments. FIGS. 6A and 6B illustrate schematic front views of window panels and edge lighting modules. FIGS. 6C-6E each provide a schematic top view of a respectively illuminated window panel of the window panels of FIGS. 6A and 6B. In some embodiments, the examples 600a-600e may include one or more multiple features, components, and/or operations of embodiments described herein with reference to FIGS. 1-5 and 7-12.

Examples 600a (illustrated in FIG. 6A) and 600b (illustrated in FIG. 6B) show window panels that are coupled to edge lighting modules. In example 600a, the window panels are in a first state where they are not being illuminated by the edge lighting modules. In example 600b, the window panels are in a second state where they are being illuminated by the edge lighting modules.

The window panels 602a, 604a, 606a are coupled to a top edge lighting module 608a and a bottom edge lighting module 610a. The first window panel 602a is substantially without surface or volume defects. The second window panel 604a includes volume defects (not visible in FIG. 6A). The third window panel 606a includes surface defects 612a. As will be discussed in further detail below with reference to FIGS. 6C-6E, the edge lighting modules 608a, 610a may each include one or more light sources and one or more light guides. The light guides may be configured to direct light from the light source to the window.

In example 600b (illustrated in FIG. 6B), the window panels 602a-606a are being illuminated by the edge lighting modules 608a, 610a. Differences between the effects of the illumination on the respective window panels are evident. The first window panel 602a, which is substantially free of surface or volume defects, does not substantially change in appearance as a result of the illumination in example 600b as compared to its appearance in example 600a (illustrated in FIG. 6A). The second panel 604a, which includes volume defects, glows substantially throughout as a result of the illumination causing the volume defects to act as secondary light sources, thus facilitating detection of the volume defects. The third panel 606a, which includes surface defects, glows along an outer rectangular portion corresponding to where the surface defects are located, as a result of the illumination causing the surface defects to act as secondary light sources, thus facilitating detection of the surface defects.

Example 600c in FIG. 6C shows a schematic top view of the first window panel 602a and a portion of the top edge lighting module 608a, where the first window panel 602a is being illuminated by the top edge lighting module 608a and/or the bottom edge lighting module 610a. The top edge lighting module 608a may include a light source 602c (e.g., a light-emitting diode (LED)) and a light guide 604c (e.g., a light guide plate). In some examples, the light source 602c may be coupled (e.g., via one or more wires) to a power source (not shown) configured to provide electrical power to the light source 602c. The light guide 604c may be configured to direct light from the light source 602c to at least a portion of the first window panel 602a. For instance, the light guide 604c may extend along a top edge of the first window panel 602a and may be configured to provide light in a downward direction through the first window panel 602a. Furthermore, the light guide 604c may be configured to direct light from the light source 602c in one or more other directions, e.g., the directions indicated by the light rays 606c in example 600c. Because the first window panel 602a is substantially without surface or volume defects, example 600c does not indicate any defects acting as secondary light sources as a result of illumination of the first window panel 602a by the top edge lighting module 608a and/or the bottom edge lighting module 610a.

Example 600d in FIG. 6D shows a schematic top view of the second window panel 604a and a portion of the top edge lighting module 608a, where the second window panel 604a is being illuminated by the top edge lighting module 608a and/or the bottom edge lighting module 610a. Because the second window panel 604a includes volume defects 602d, example 600d indicates the volume defects 602d acting as secondary light sources as a result of illumination of the second window panel 604a by the top edge lighting module 608a and/or the bottom edge lighting module 610a. For example, the volume defects 602d, when acting as secondary light sources, may direct light in directions indicated by the light rays 604e in example 600d. In this manner, the volume defects 602d may be easier to detect, e.g., by sensor devices such as those described herein with respect to FIGS. 1-5 and 7-12.

Example 600e in FIG. 6E shows a schematic top view of the third window panel 606a and a portion of the top edge lighting module 608a, where the third window panel 606a is being illuminated by the top edge lighting module 608a and/or the bottom edge lighting module 610a. Because the third window panel 606a includes surface defects 612a, example 600e indicates the surface defects 612a acting as secondary light sources as a result of illumination of the third window panel 606a by the top edge lighting module 608a and/or the bottom edge lighting module 610a. For example, the surface defects 612a, when acting as secondary light sources, may direct light in directions indicated by the light rays 602e in example 600e. In this manner, the surface defects 612a may be easier to detect, e.g., by sensor devices such as those described herein with respect to FIGS. 1-5 and 7-12.

Figure 7:
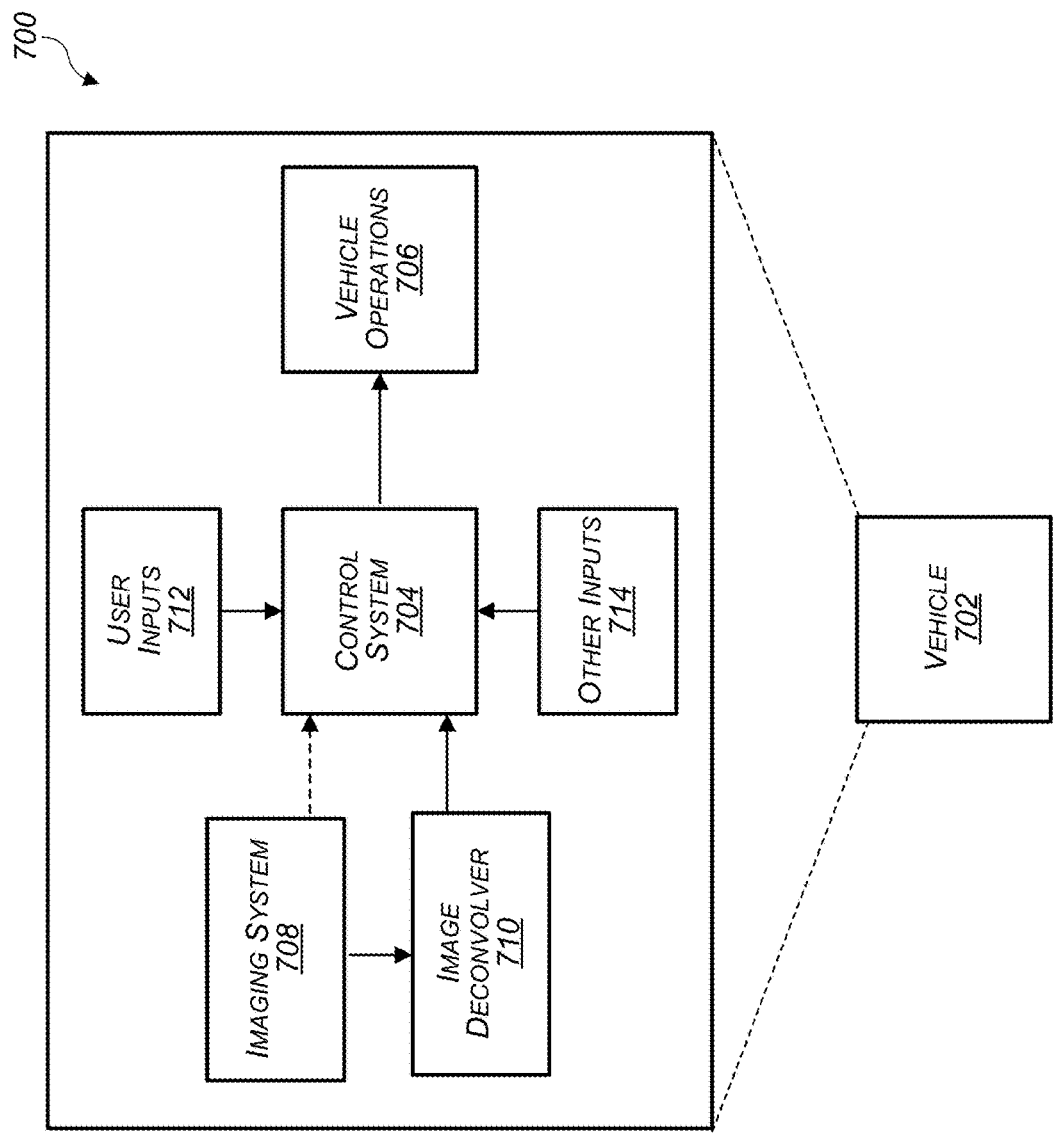
FIG. 7 is a block diagram illustrating an example vehicle system environment in which a control system uses multiple inputs to determine vehicle operations, in accordance with some embodiments. The inputs used by the control system to determine vehicle operations may include inputs from an imaging system and/or an image deconvolver, in accordance with some embodiments.

FIG. 7 is a block diagram illustrating an example vehicle system environment 700 in which a control system uses multiple inputs to determine vehicle operations, in accordance with some embodiments. As discussed below, the inputs used by the control system to determine vehicle operations may include inputs from an imaging system and/or an image deconvolver, in accordance with some embodiments. In some embodiments, the vehicle system environment 700 may include one or more multiple features, components, and/or operations of embodiments described herein with reference to FIGS. 1-6 and 8-12.

According to various examples, the vehicle system environment 700 may include a vehicle 702 (e.g., an autonomous or partially-autonomous vehicle) and a control system 704 configured to control vehicle operations 706. For instance, the control system 704 may include one or more controllers and/or processors. In some examples, the control system 704 may be part of the vehicle 702. Furthermore, the vehicle 702 may include an imaging system 708 (e.g., the imaging systems and/or sensor devices described herein with reference to FIGS. 1-6E and 8-12) and/or an image deconvolver 710 (e.g., the image deconvolvers described herein with reference to FIGS. 1-6E and 8-12). In some cases, the control system 704 and/or the image deconvolver 710 may be separate and/or remote from the vehicle 702.

In some embodiments, the vehicle 702 may include one or more windows (e.g., the windows described herein with reference to FIGS. 1-6E and 8-11). For instance, the window(s) may at least partially encompass an interior of the vehicle 702. Furthermore, the vehicle 702 may include one or more lighting modules (e.g., the lighting modules described herein with respect to FIGS. 1-6E and 8-11) configured to illuminate the window(s) to facilitate detection of defects associated with the window(s). The imaging system 708 may include one or more sensor devices configured to perform imaging of objects, such as the window(s) and one or more scenes (e.g., a scene that is exterior to the vehicle 702).

In various examples, the image deconvolver 710 may be configured to receive, as input, data and/or signals corresponding to images obtained via the imaging system 708. For instance, the image deconvolver 710 may receive first data obtained via imaging of a window by the imaging system 708. The first data may include data corresponding to defects associated with a window of the vehicle 702. Furthermore, the image deconvolver 710 may receive second data obtained via imaging of a scene by the imaging system 708. The second data may include an altered representation of the scene based at least in part on image altering effects induced by the defects associated with the window. The image deconvolver 710 may be configured to deconvolve the second data based at least in part on at least one of the first data to produce a corrected image of the scene, e.g., as discussed above with reference to FIG. 1.

According to various embodiments, the control system 704 may receive, as inputs, data from the imaging system 708 and/or the image deconvolver 710. Additionally, and/or alternatively, the control system 704 may receive user inputs 712 and/or other inputs 714. For instance, user inputs 712 may include inputs to a user interface of the vehicle 702, such as inputs corresponding to vehicle operations 706 that the user desires to implement. Other inputs 714 may include, for example, data from other sensors of the vehicle 702, time data, weather data, calendar data, data from other vehicles (e.g., location and/or motion data associated with other vehicles), historical data, etc. In some instances, the other inputs 714 may be obtained from one or more sources that are external to the vehicle 702, for example, via wireless communication over one or more networks.

In some implementations, the control system 704 may include decision making components configured to make determinations with respect to various aspects of vehicle operations 706. For instance, the control system 704 may be configured to make motion-related decisions, such as whether to accelerate, slow down, change lanes, etc. Furthermore, the control system 704 may be configured to control various aspects of vehicle operations 706. For instance, the control system 704 may send instructions to various components of the vehicle 702 to control the vehicle operations 706 (which may include, for example, operations of the imaging system 708 and/or the image deconvolver 710). In some embodiments, the control system 706 may be configured to make decisions with respect to utilization of data received from the imaging system 708 and/or the image deconvolver 710. In some instances, e.g., if there is redundancy with other sensors in the vehicle 702, the control system 706 may determine to exclude one or more particular portions of the window from image analysis and/or image correction. In some cases, the control system 706 may instruct the image deconvolver 710 to not perform image correction with respect to data corresponding to one or more particular portions of the window. In some embodiments, the portion(s) of the window that are to be excluded from image analysis and/or image correction may be determined based at least in part on data from the imaging system 708 and/or the image deconvolver 710, degrees of confidence assigned to data received from the imaging system 708 and/or the image deconvolver 710 (discussed below), parameter evaluation data (discussed below), user inputs 712, and/or the other inputs 714.

According to some embodiments, the control system 704 may be configured to determine to modify a state of operation of the vehicle 702 based at least in part on data received from the imaging system 708 and/or the image deconvolver 710. For instance, the control system 704 may modify a state of the vehicle operations 706 based at least in part on data corresponding to defects associated with the window(s) and/or data corresponding to corrected images produced by the image deconvolver 710.

In some cases, the control system 704 may be configured to assign one or more degrees of confidence to data received from the imaging system 708 and/or the image deconvolver 710, as described below with reference to FIG. 9. As a non-limiting example, a respective degree of confidence may be assigned to each of: data corresponding to defects associated with the window, data corresponding to a representation of the scene, and/or corrected images produced by the image deconvolver 710. The respective degrees of confidence may be compared to one or more confidence level thresholds (e.g., a low confidence threshold, a moderate confidence threshold, a high confidence threshold, etc.). Based at least in part on the degrees of confidence and/or a comparison of the degrees of confidence to a confidence level threshold, the control system 704 may determine whether to modify a state of the vehicle operations 706. For instance, in making decisions, the control system 704 may disregard data that is determined to correspond to a particular confidence level (e.g., a low confidence level). Furthermore, in making decisions, the control system 704 may assign a higher priority to data that is determined to correspond to a particular confidence level (e.g., a high confidence level) and/or may assign a lower priority to data that is determined to correspond to a lower confidence level (e.g., a lower confidence level).

In some embodiments, the control system 704 may be configured to make decisions with respect to a window cleaning system of the vehicle 702, as described below with reference to FIG. 10. The window cleaning system may be configured to clean the window(s). For instance, the window cleaning system may be configured to perform spot cleaning. That is, the window cleaning system may clean particular portions, or spots, of the window(s). In some examples, the window cleaning system may include one or more window wiping components, one or more window cleaning fluids (e.g., water, a solution, etc.), and/or one or more fluid dispensers.

The control system 704 may be configured to evaluate one or more parameters that characterize the defects associated with the window(s) to produce parameter evaluation data. For example, the parameters that characterize the defects may include a distribution of the defects with respect to the window. Other parameters that characterize the defects may include type, shape, size, chemistry, location, pattern, movement, etc., of the defects. In some implementations, the control system 704 may evaluate the parameters based at least in part on data received from the imaging system 708 and/or the image deconvolver 710, such as data corresponding to defects associated with the window(s) obtained via the imaging system 708. As a non-limiting example, the control system 704 may use the parameter evaluation data to determine that a first portion of a window should be spot cleaned and to determine that a second portion of the window should not be spot cleaned, and thus the control system 704 may instruct the window cleaning system to spot clean the first portion of the window but not spot clean the second portion of the window.

Additionally, or alternatively, the control system 704 may be configured to determine whether to designate a repair status and/or a replace status to a window (or a portion of the window), as described below with reference to FIG. 11. For instance, as discussed above, the control system 704 may evaluate the parameters that characterize the defects to produce parameter evaluation data. The control system 704 may use the parameter evaluation data to make the decision of whether to designate a repair status and/or a replace status to the window. Designation of a repair status may indicate a suggestion to repair at least a portion of the window. Likewise, designation of a replace status may indicate a suggestion to replace at least a portion of the window. Such suggestions may be provided via an audible and/or a visible output. For example, the vehicle 702 may include an electronic display, and the control system 704 may cause the electronic display to present a user interface that provides a visible suggestion to repair and/or replace the window. Additionally, or alternatively, the vehicle 702 may include one or more speakers, and the control system 704 may cause the speakers to present an audible suggestion to repair and/or replace the window.

Figure 8:
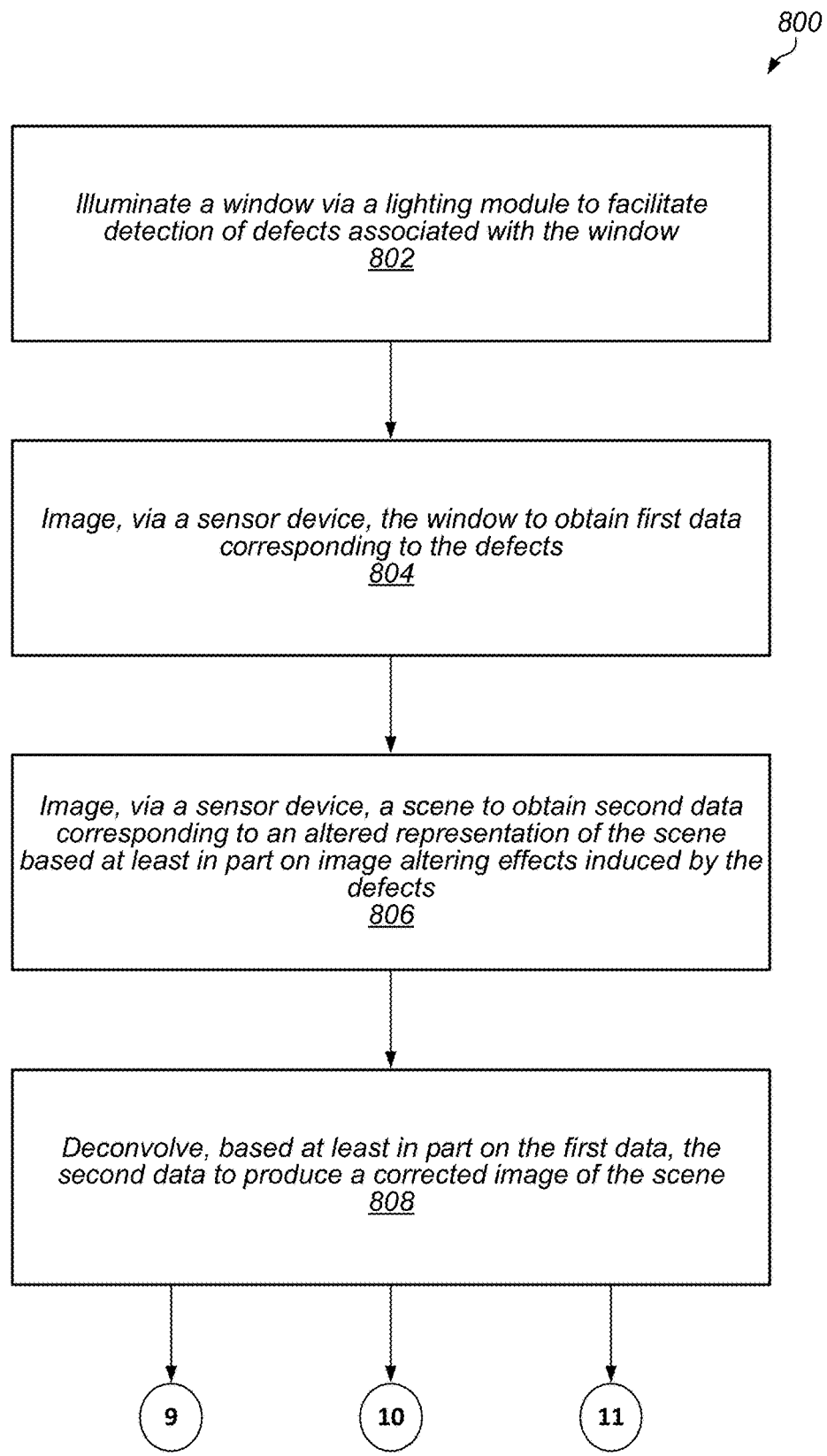
FIG. 8 is a flowchart of an example method of detecting defects associated with a window and/or performing image processing to produce a corrected image of a scene based at least partly on data corresponding to the detected defects, in accordance with some embodiments.

FIG. 8 is a flowchart of an example method 800 of detecting defects associated with a window and/or performing image processing to produce a corrected image of a scene based at least partly on data corresponding to the detected defects, in accordance with some embodiments. In some embodiments, the method 800 may include one or more multiple features, components, and/or operations of embodiments described herein with reference to FIGS. 1-7 and 9-12.

At 802, the method 800 may include illuminating a window via one or more lighting modules to facilitate detection of defects associated with the window. For instance, as described above with reference to FIGS. 1-7, the lighting modules may include one or multiple edge lighting modules and/or one or multiple graze lighting modules.

At 804, the method 800 may include imaging the window to obtain first data corresponding to the defects associated with the window. For instance, as described above with reference to FIGS. 1-7, one or more sensor devices (e.g., a sensor device of an imaging system) may be used to image the window. At 806, the method 800 may include imaging a scene to obtain second data corresponding to an altered representation of the scene based at least in part on image altering effects induced by the defects associated with the window. For instance, as described above with reference to FIGS. 1-7, one or more sensor devices (e.g., a sensor device) may be used to image the scene. In some embodiments, the sensor device used to image the window may also be used to image the scene. In other embodiments, a sensor device may be used to image the window and another sensor device may be used to image the scene.

At 808, the method 800 may include deconvolving, based at least in part on the first data, the second data to produce a corrected image of the scene. For example, to deconvolve the second data, an image deconvolver may perform image processing to compensate for the image altering effects induced by the defects.

As indicated in FIG. 8, in some embodiments, the method 800 may include one or more of the operations discussed below with reference to FIGS. 9-11.

Figure 9:
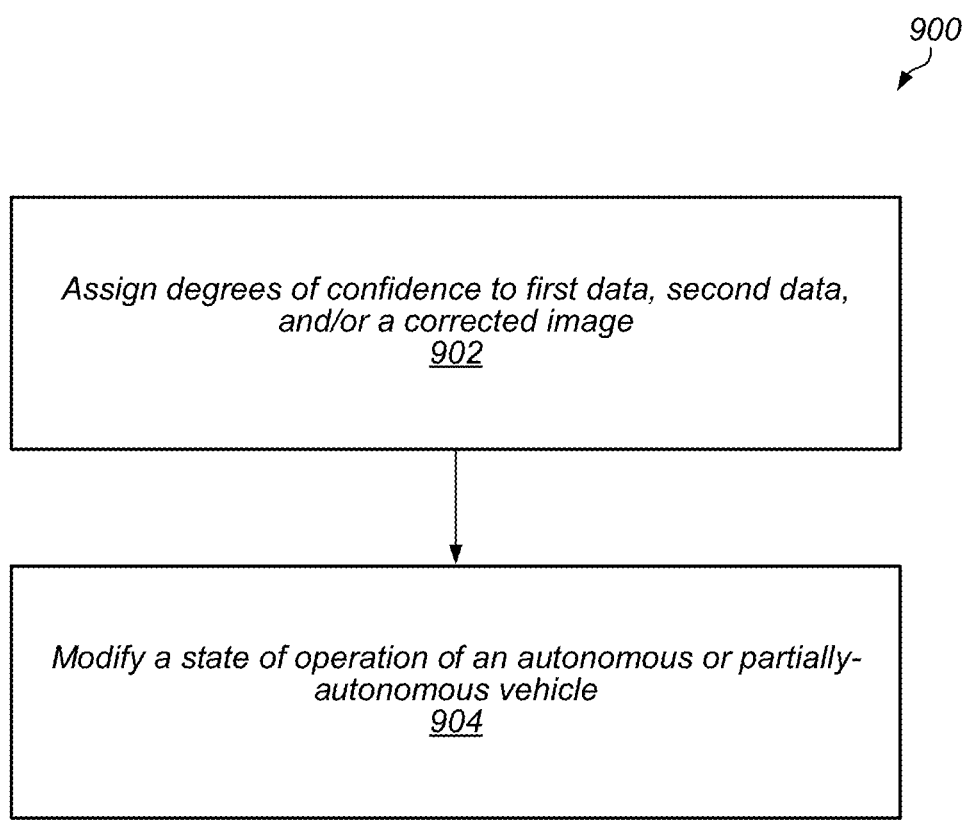
FIG. 9 is a flowchart of an example method of modifying a state of operation of an autonomous or partially-autonomous vehicle, in accordance with some embodiments.

FIG. 9 is a flowchart of an example method 900 of modifying a state of operation of a vehicle (e.g., an autonomous or partially-autonomous vehicle), in accordance with some embodiments. In some embodiments, the method 900 may include one or more multiple features, components, and/or operations of embodiments described herein with reference to FIGS. 1-8 and 10-12.

At 902, the method 900 may include assigning degrees of confidence to first data, second data, and/or a corrected image (e.g., the first data, the second data, and/or the corrected image of the method 800 discussed above with reference to FIG. 8). For instance, as described above with reference to FIG. 7, a control system of a vehicle may be configured to assign one or more degrees of confidence to data received from the imaging system and/or the image deconvolver. In some cases, the degrees of confidence may be compared to one or more confidence level thresholds. At 904, the method 900 may include modifying and/or determining to modify a state of operation of the vehicle. For instance, as described above with reference to FIG. 7, the control system of the vehicle may determine to modify a state of operation of the vehicle based at least in part on: data received from the imaging system and/or the image deconvolver, degrees of confidence assigned to the data received from the imaging system and/or the image deconvolver, and/or a comparison of one or more of the degrees of confidence to one or more confidence level thresholds.

Figure 10:
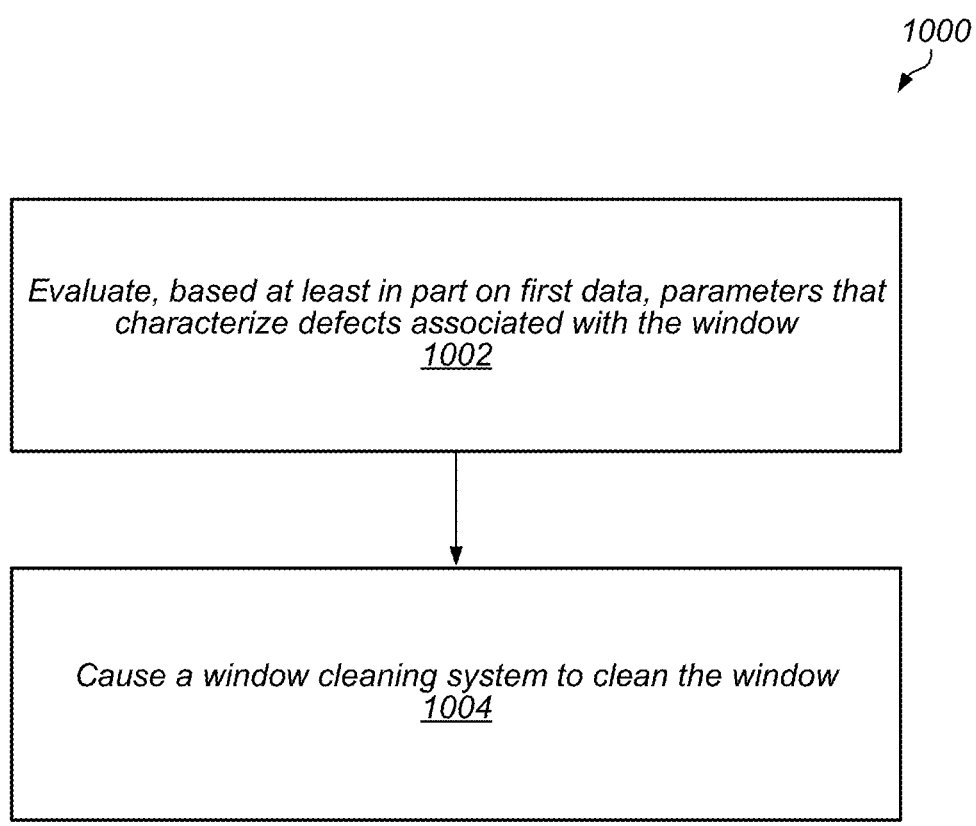
FIG. 10 is a flowchart of an example method of causing a window cleaning system to clean a window, in accordance with some embodiments.

FIG. 10 is a flowchart of an example method 1000 of causing a window cleaning system to clean a window, in accordance with some embodiments. In some embodiments, the method 1000 may include one or more multiple features, components, and/or operations of embodiments described herein with reference to FIGS. 1-9 and 10-12.

At 1002, the method 1000 may include evaluating parameters that characterize defects associated with the window. For instance, the parameters may be evaluated based at least in part on the first data of the method 800 discussed above with reference to FIG. 8. As described above with reference to FIG. 7, in some embodiments a control system of a vehicle may be configured to evaluate the parameters to produce parameter evaluation data. In some instances, the parameters that characterize the defects may include a distribution of the defects with respect to the window. Other parameters that characterize the defects may include type, shape, size, chemistry, location, pattern, movement, etc., of the defects.

At 1004, the method 1000 may include causing a window cleaning system to clean the window. For instance, as described above with reference to FIG. 7, a control system may be configured to cause the window cleaning system to clean part (e.g., particular spots) or the entire window. In some examples, the window cleaning system may include one or more window wiping components, one or more window cleaning fluids (e.g., water, a solution, etc.), and/or one or more fluid dispensers. As a non-limiting example, the parameter evaluation data may be used to determine that a first portion of a window should be spot cleaned and to determine that a second portion of the window should not be spot cleaned. Based at least in part on such a determination, the window cleaning system may be instructed to spot clean the first portion of the window but not spot clean the second portion of the window. In some examples, instructions may cause at least a portion of the window cleaning system to move proximate to, and/or aim at, one or more portions of the window that are to be cleaned. For instance, a window cleaning component may be moved to a location proximate a portion of the window such that the window cleaning component is capable of cleaning the portion of the window. Additionally, or alternatively, a fluid dispenser may be aimed at the portion of the window such that the fluid dispenser is capable of dispensing a window cleaning fluid at the portion of the window.

Figure 11:
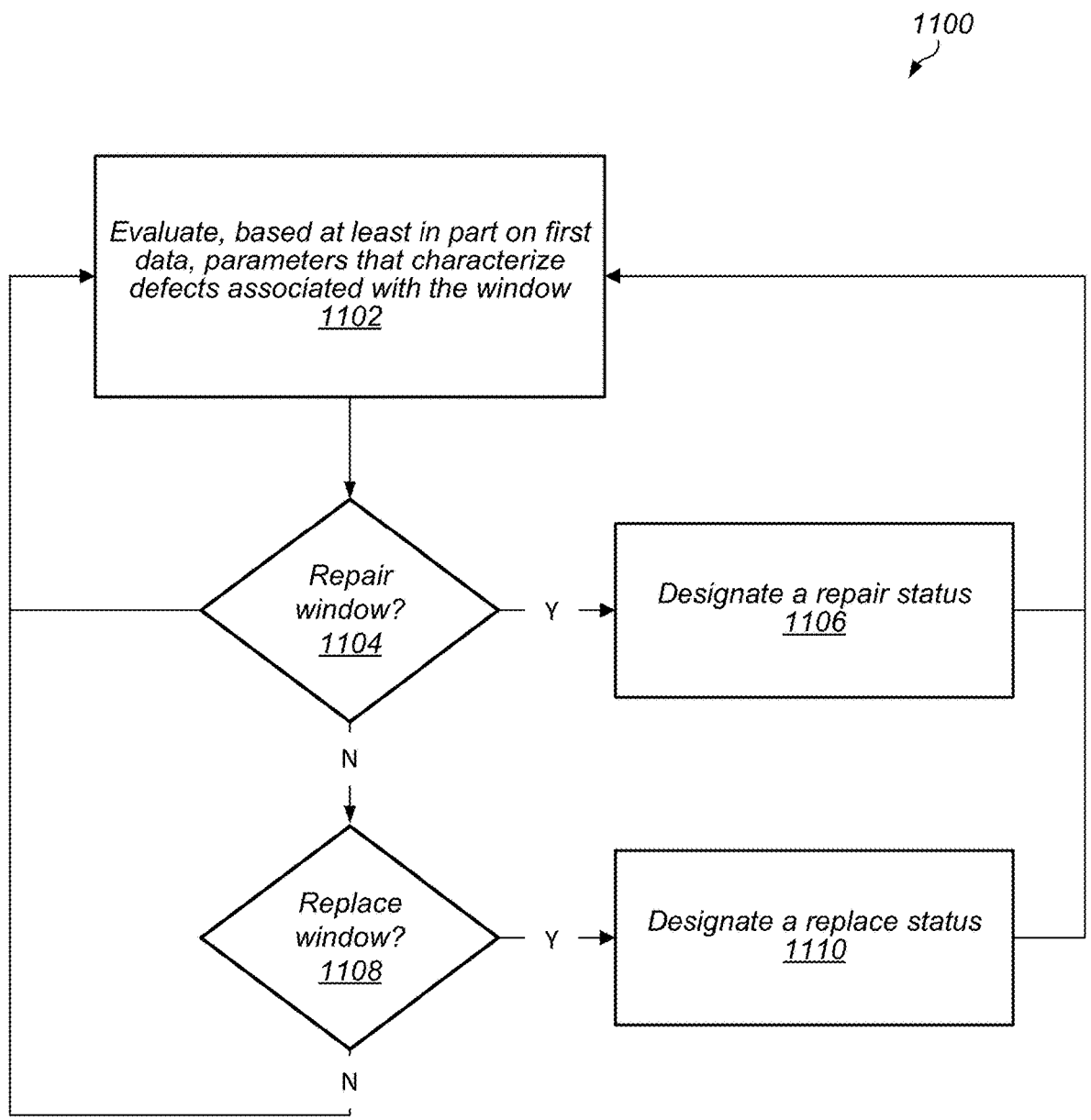
FIG. 11 is a flowchart of an example method of designating a repair status and/or a replace status to a window, in accordance with some embodiments.

FIG. 11 is a flowchart of an example method 1100 of designating a repair status and/or a replace status to a window, in accordance with some embodiments. In some embodiments, the method 1100 may include one or more multiple features, components, and/or operations of embodiments described herein with reference to FIGS. 1-10 and 12.

At 1102, the method 1100 may include evaluating parameters that characterize defects associated with the window. For instance, the parameters may be evaluated based at least in part on the first data of the method 800 discussed above with reference to FIG. 8. As described above with reference to FIG. 7, in some embodiments a control system of a vehicle may be configured to evaluate the parameters to produce parameter evaluation data. In some instances, the parameters that characterize the defects may include a distribution of the defects with respect to the window. Other parameters that characterize the defects may include type, shape, size, chemistry, location, pattern, movement, etc., of the defects.

At 1104, the method 1100 may include determining whether the window should be repaired. If it is determined, at 1104, that the window should be repaired, then the method 1100 may include designating a repair status to the window, at 1106. If, on the other hand, it is determined, at 1104, that the window should not be repaired, then the method 1100 may include determining whether the window should be replaced, at 1108. If it is determined, at 1108, that the window should be replaced, then the method 1100 may include designating a replace status to the window. If, on the other hand, it is determined, at 1108, that the window should not be replaced, then the method 1000 may continue to evaluate the parameters that characterize defects associated with the window, at 1102. In various embodiments, evaluation of the parameters may occur continuously, periodically, and/or in response to an event and/or a trigger (e.g., after a repair status and/or a replace status designation, in response to a user request, etc.).

As described above with reference to FIG. 7, in various embodiments parameter evaluation data may be used to make the decision of whether to designate a repair status and/or a replace status. Designation of a repair status may indicate a suggestion to repair at least a portion of the window. Likewise, designation of a replace status may indicate a suggestion to replace at least a portion of the window.

Figure 12:
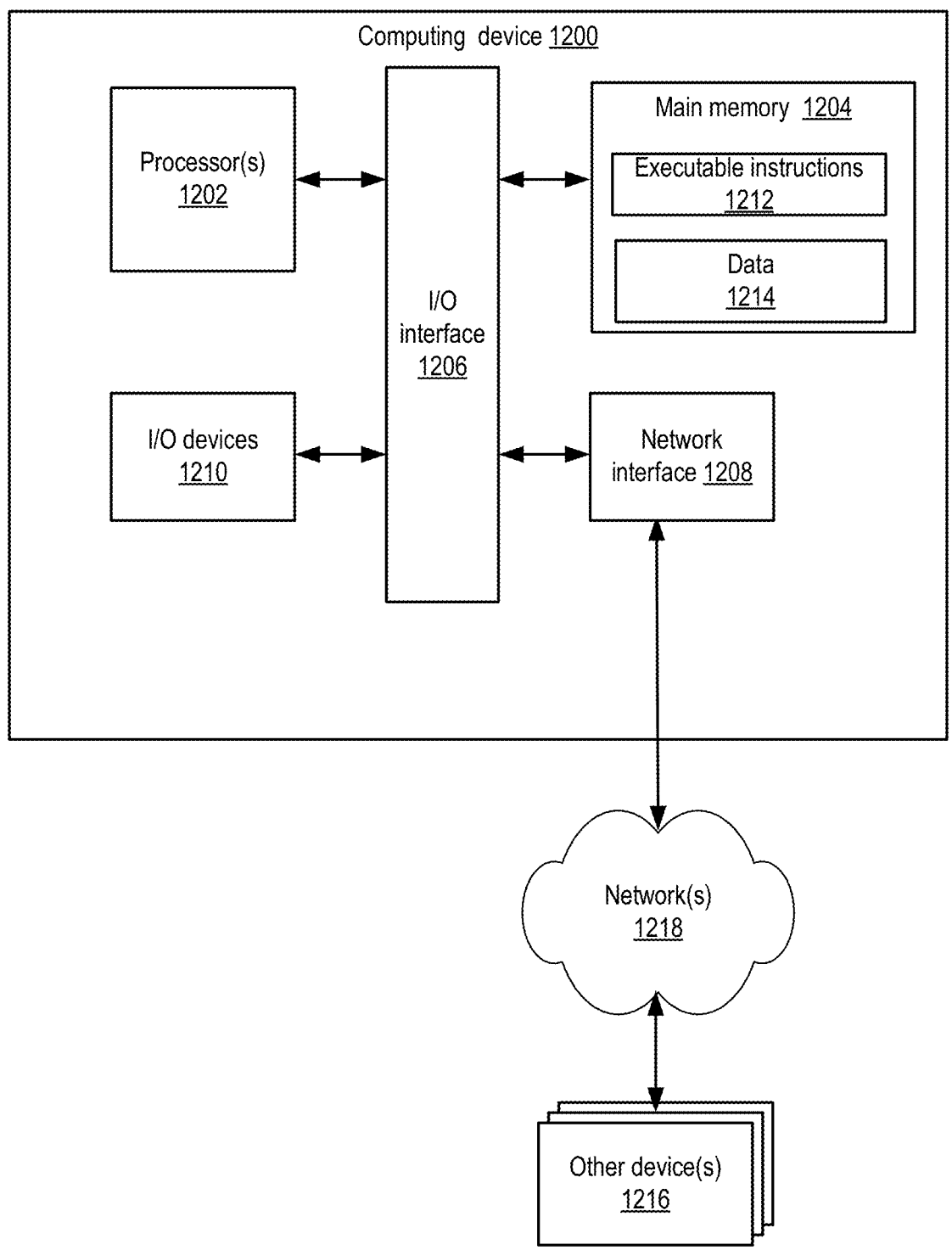
FIG. 12 is a block diagram illustrating an example computing device that may be used in at least some embodiments.

FIG. 12 is a block diagram illustrating an example computing device 1200 that may be used in at least some embodiments. In some embodiments, the computing device 1200 may implement a portion or all of one or more of the operations described herein with reference to FIGS. 1-11. In some examples, the computing device 1200 may include a general-purpose computing system that includes or is configured to access one or more computer-accessible media.

In some embodiments, the computing device 1200 may include one or more processors 1202 coupled to a main memory 1204 (which may comprise both non-volatile and volatile memory modules, and may also be referred to as system memory) via an input/output (I/O) interface 1206. Computing device 1200 may further include a network interface 1208 coupled to I/O interface 1206, as well as additional I/O devices 1210 which may include sensors of various types.

In various embodiments, computing device 1200 may be a uniprocessor system including one processor 1202, or a multiprocessor system including several processors 1202 (e.g., two, four, eight, or another suitable number). Processors 1202 may be any suitable processors capable of executing instructions. For example, in various embodiments, processors 1202 may be general-purpose or embedded processors implementing any of a variety of instruction set architectures (ISAs), such as the x86, PowerPC, SPARC, or MIPS ISAs, or any other suitable ISA. In multiprocessor systems, each of processors 1202 may commonly, but not necessarily, implement the same ISA. In some implementations, graphics processing units (GPUs) may be used instead of, or in addition to, conventional processors.

Memory 1204 may be configured to store instructions and data accessible by processor(s) 1202. In at least some embodiments, the memory 1204 may comprise both volatile and non-volatile portions; in other embodiments, only volatile memory may be used. In various embodiments, the volatile portion of system memory 1204 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 1212 and data 1214 implementing one or more desired functions, such as those methods, techniques, and data described above with reference to FIGS. 1-11, are shown stored within main memory 1204.

In some embodiments, I/O interface 1206 may be configured to coordinate I/O traffic between processor 1202, main memory 1204, and various peripheral devices, including network interface 1208 or other peripheral interfaces such as various types of persistent and/or volatile storage devices, sensor devices, etc. In some examples, I/O interface 1206 may perform any necessary protocol, timing or other data transformations to convert data signals from one component (e.g., main memory 1204) into a format suitable for use by another component (e.g., processor 1202). In some embodiments, I/O interface 1206 may include support for devices attached through various types of peripheral buses, such as a variant of the Peripheral Component Interconnect (PCI) bus standard or the Universal Serial Bus (USB) standard, for example. In some embodiments, the function of I/O interface 1206 may be split into two or more separate components, such as a north bridge and a south bridge, for example. Also, in some embodiments some or all of the functionality of I/O interface 1206, such as an interface to memory 1204, may be incorporated directly into processor 1202.

Network interface 1208 may be configured to allow data to be exchanged between computing device 1200 and other devices 1216 attached to a network or networks 1218, such as other computer systems or devices as described above with reference to FIGS. 1-11, for example. In various embodiments, network interface 1208 may support communication via any suitable wired or wireless general data networks, such as types of Ethernet network, for example. Additionally, network interface 1208 may support communication via telecommunications/telephony networks such as analog voice networks or digital fiber communications networks, via storage area networks such as Fibre Channel SANs, or via any other suitable type of network and/or protocol.

In some embodiments, main memory 1204 may be one embodiment of a computer-accessible medium configured to store program instructions and data as described above with reference to FIGS. 1-11 for implementing embodiments of the corresponding methods, systems, and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1200 via I/O interface 1206. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1200 as main memory 1204 or another type of memory. Further, a computer-accessible medium may include transmission media or signals such as electrical, electromagnetic, or digital signals, conveyed via a communication medium such as a network and/or a wireless link, such as may be implemented via network interface 1208. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a physical window;
a first sensor device to image at least a portion of the physical window;
a second sensor device to image at least a portion of a scene, wherein the at least a portion of the physical window is located within a field of view of the second sensor device;
one or more lighting modules to illuminate the at least a portion of the physical window to facilitate detection of one or more defects associated with the at least a portion of the physical window; and
one or more processors that:
  receive a first set of one or more signals corresponding to a first image, captured by the first sensor device while the at least a portion of the physical window is illuminated by the one or more lighting modules, wherein the first set of one or more signals includes data corresponding to the one or more defects associated with the at least a portion of the physical window;
  receive a second set of one or more signals corresponding to a second image, captured by the second sensor device, of the at least a portion of the scene, wherein the second image includes an altered representation of the at least a portion of the scene based at least in part on one or more image altering effects induced by the one or more defects associated with the at least a portion of the physical window; and
  produce, based at least in part on the first set of one or more signals and the second set of one or more signals, a corrected image of the at least a portion of the scene, wherein to produce the corrected image the one or more processors perform image processing to compensate for the one or more image altering effects induced by the one or more defects associated with the at least a portion of the physical window.

2. The system of claim 1, wherein the one or more lighting modules include at least one of:
an edge lighting module to emit light that is incident on at least one edge of the physical window; or
a graze lighting module to emit light that is incident on at least one side of the physical window.

3. The system of claim 2, wherein the edge lighting module includes:
one or more light sources; and
a light guide to direct light from the one or more light sources to the at least a portion of the physical window, wherein the light guide extends along at least a portion of an edge of the physical window.

4. The system of claim 1, wherein the one or more lighting modules include:
a first edge lighting module that is located at a top edge of the physical window and that provides light in a downward direction through the at least a portion of the physical window; or
a second edge lighting module that is located at a bottom edge of the physical window and that provides light in an upward direction through the at least a portion of the physical window.

5. The system of claim 1, wherein the one or more image altering effects include at least one of:
shadowing;
scattering;
distortion; or
glint.

6. The system of claim 1, wherein:
the first sensor device is a first camera that is focused on the at least a portion of the physical window; and
the second sensor is a second camera that is focused on the at least a portion of the scene.

7. The system of claim 1:
wherein the physical window at least partially encompasses an interior of a vehicle;
wherein the one or more processors are configured to:
evaluate, based at least in part on the first set of one or more signals, one or more parameters that characterize one or more defects associated with the at least a portion of the physical window to produce parameter evaluation data, wherein the one or more parameters include a distribution of the one or more defects with respect to the at least a portion of the physical window; and
determine to modify a state of operation of the vehicle based at least in part on the parameter evaluation data.

8. The system of claim 7, wherein the one or more lighting modules include at least one of:
a first edge lighting module that is located at a top edge of the physical window and that provides light in a downward direction through the physical window; or
a second edge lighting module that is located at a bottom edge of the physical window and that provides light in an upward direction through the physical window.

9. The system of claim 7, wherein the one or more lighting modules include at least one of:
a first graze lighting module to provide light that is incident on a first side of the physical window; or
a second graze lighting module to provide light that is incident on a second side of the physical window.

10. The system of claim 7, wherein:
the at least a portion of the scene is exterior to the vehicle.

11. The system of claim 10, wherein the first sensor device and the second sensor device are part of an imaging system of the vehicle.

12. The system of claim 11, wherein:
the at least a portion of the window is a first portion of the physical window;
the one or more lighting modules illuminate a second portion of the physical window to facilitate detection of one or more defects associated with the second portion of the physical window;
the imaging system further includes:
a third sensor device to obtain third data by imaging the second portion of the physical window while the second portion of the physical window is illuminated by the one or more lighting modules, wherein at least a portion of the third data corresponds to a third image that includes a representation of the one or more defects associated with the second portion of the physical window; and
to produce the corrected image, the one or more processors perform image processing based at least in part on the third data obtained by the third sensor.

13. The system of claim 10, wherein:
the vehicle is an autonomous or partially-autonomous vehicle; and
the one or more processors are further to:
determine to modify a state of operation of the autonomous or partially-autonomous vehicle based at least in part on one or more of:
the first set of one or more signals; or
the corrected image.

14. The system of claim 10, wherein:
the vehicle is an autonomous or partially-autonomous vehicle; and
the one or more processors are further to:
assign one or more degrees of confidence to one or more of:
the first set of one or more signals;
the second set of one or more signals; or
the corrected image; and
determine to modify a state of operation of the autonomous or partially-autonomous vehicle based at least in part on the one or more degrees of confidence.

15. The system of claim 7, further comprising:
a window cleaning system configured to spot clean the physical window;
wherein the one or more processors are further to:
cause, based at least in part on the parameter evaluation data, the window cleaning system to spot clean one or more particular areas of the at least a portion of the physical window.

16. The system of claim 7, wherein the one or more processors are further to:
designate, based at least in part on the parameter evaluation data, at least one of a repair status or a replace status to the at least a portion of the physical window, wherein:
designation of the repair status indicates a suggestion to repair the at least a portion of the physical window; and
designation of the replace status indicates a suggestion to replace the physical window.

17. The system of claim 7, wherein the second sensor device includes at least one of:
- a camera;
- a radar device; or
- a light detection and ranging (LIDAR) device.

18. A method, comprising:
- illuminating, via one or more lighting modules, at least a portion of a physical window such that one or more defects associated with the at least a portion of the physical window are illuminated to facilitate detection of the one or more defects, wherein the one or more lighting modules include at least one of:
  - an edge lighting module to emit light that is incident on at least one edge of the physical window; or
  - a graze lighting module to emit light that is incident on at least one side of the physical window;
- imaging, via a first sensor device, the at least a portion of the physical window to obtain first data corresponding to the one or more defects, wherein the imaging occurs while the one or more defects are illuminated based at least in part on the illuminating;
- imaging, via a second sensor device, at least a portion of a scene to obtain second data corresponding to an altered representation of the at least a portion of the scene based at least in part on one or more image altering effects induced by the one or more defects, wherein the at least a portion of the physical window is located between the second sensor device and the at least a portion of the scene; and
- producing, based at least in part on the first data and the second data, a corrected image, wherein producing the corrected image includes performing image processing to compensate for the one or more image altering effects induced by the one or more defects associated with the at least a portion of the physical window.

19. The method of claim 18, wherein:
- the first sensor device is a first camera;
- the second sensor device is a second camera;
- the imaging via the first sensor device includes:
  - focusing the first camera on the at least a portion of the physical window; and
  - capturing, via the first camera, one or more images of the at least a portion of the physical window, wherein the capturing occurs while the first camera is focused on the at least a portion of the physical window; and
- the imaging via the second sensor device includes:
  - focusing the second camera on the at least a portion of the scene; and
  - capturing, via the second camera, one or more images of the at least a portion of the scene, wherein the capturing occurs while the second camera is focused on the at least a portion of the scene.

20. The method of claim 18, wherein:
- the physical window, the first sensor device, and the second sensor device are part of an autonomous or partially-autonomous vehicle;
- the image processing is performed by one or more processors of the autonomous or partially-autonomous vehicle; and
- the method further includes:
  - determining, by the one or more processors, to modify a state of operation of the autonomous or partially-autonomous vehicle based at least in part on one or more of:
    - the first data; or
    - the corrected image.

* * * * *